(12) United States Patent
Karkheck et al.

(10) Patent No.: US 11,401,675 B2
(45) Date of Patent: Aug. 2, 2022

(54) AXIALLY ADJUSTABLE CONNECTORS FOR TRUSS LEGS AND RELATED SYSTEMS AND METHODS

(71) Applicant: Ojjo, Inc., San Rafael, CA (US)

(72) Inventors: Johann Karkheck, Petaluma, CA (US); Greg McPheeters, Santa Cruz, CA (US); Jack West, San Rafael, CA (US); Katie Pesce, El Cerrito, CA (US)

(73) Assignee: Ojjo, Inc., San Rafael, CA (US)

( * ) Notice: Subject to any disclaimer, the term of this patent is extended or adjusted under 35 U.S.C. 154(b) by 5 days.

(21) Appl. No.: 16/931,443

(22) Filed: Jul. 16, 2020

(65) Prior Publication Data

US 2021/0017729 A1 Jan. 21, 2021

Related U.S. Application Data

(60) Provisional application No. 62/882,446, filed on Aug. 2, 2019, provisional application No. 62/874,516, filed on Jul. 16, 2019.

(51) Int. Cl.
*E02D 5/80* (2006.01)
*H02S 20/30* (2014.01)
*E02D 27/50* (2006.01)

(52) U.S. Cl.
CPC ............. *E02D 5/801* (2013.01); *E02D 5/805* (2013.01); *E02D 27/50* (2013.01); *H02S 20/30* (2014.12)

(58) Field of Classification Search
CPC ......... E02D 5/801; E02D 5/805; E02D 27/50; F24S 25/70; F24S 25/617; F24S 30/425;

(Continued)

(56) References Cited

U.S. PATENT DOCUMENTS 3,721,463 A * 3/1973 Attwood ................. F16B 9/054
 403/258
5,228,924 A * 7/1993 Barker ................... F24S 30/425
 136/246

(Continued)

FOREIGN PATENT DOCUMENTS

EP 1989494 B1 2/2013
JP 2017139942 A 8/2017
WO WO-9010133 A1 * 9/1990 ......... E04H 12/2253

OTHER PUBLICATIONS

International Search Report PCT/US2020/023719, dated Jul. 17, 2020.

*Primary Examiner* — Jessie T Fonseca
(74) *Attorney, Agent, or Firm* — Phillip D. Mancini

(57) ABSTRACT

Systems and methods for quickly and securely interconnecting foundation components when axially misaligned without hydraulic tools. Upper to lower leg connections are made with threaded connections or with ball and socket connections that permit angular adjustment. One or more retaining nuts bias the connection to lock it in place at the desired orientation. Foundation component to single-axis tracker connections are facilitated by various wedge and clamp connector assemblies that rely on mechanical engagement to lock components in place and resist axial forces. Other connections are made with hemispherical washers and adapter plates that enable rigid connections through a range of angles.

6 Claims, 20 Drawing Sheets

(58) Field of Classification Search
CPC .......... H02S 20/10; H02S 20/30; H02S 20/32; Y02E 10/47; Y02E 10/50
See application file for complete search history.

(56) References Cited

U.S. PATENT DOCUMENTS

| | | | | |
|---|---|---|---|---|
| 6,612,772 | B1* | 9/2003 | DeMarco | F16B 7/18 403/256 |
| 7,472,666 | B1* | 1/2009 | Richard | B63B 17/02 114/361 |
| 8,413,391 | B2* | 4/2013 | Seery | F16B 2/12 52/173.3 |
| 8,511,021 | B2* | 8/2013 | Salisbury | E02D 5/223 52/296 |
| 8,609,977 | B2* | 12/2013 | Jones | H02S 40/22 136/246 |
| 8,714,881 | B2* | 5/2014 | Gagliano | E02D 5/22 405/231 |
| 9,207,000 | B2* | 12/2015 | Kruse | F24S 30/428 |
| 10,128,791 | B2* | 11/2018 | Ludwig | F24S 25/636 |
| 2008/0029148 | A1* | 2/2008 | Thompson | H02S 20/00 136/244 |
| 2009/0084429 | A1 | 4/2009 | Sureda Alsina et al. | |
| 2012/0006317 | A1* | 1/2012 | Sade | H02S 20/10 126/600 |
| 2013/0340807 | A1* | 12/2013 | Gerwing | H01L 31/02 136/246 |
| 2015/0176280 | A1 | 6/2015 | Brothersen | |
| 2015/0236636 | A1* | 8/2015 | Sade | H02S 30/10 136/246 |
| 2015/0292228 | A1* | 10/2015 | Bardelli | E04H 12/2269 52/165 |
| 2018/0006597 | A1 | 1/2018 | Patnude | |
| 2019/0372514 | A1* | 12/2019 | Almy | H02S 20/30 |

\* cited by examiner

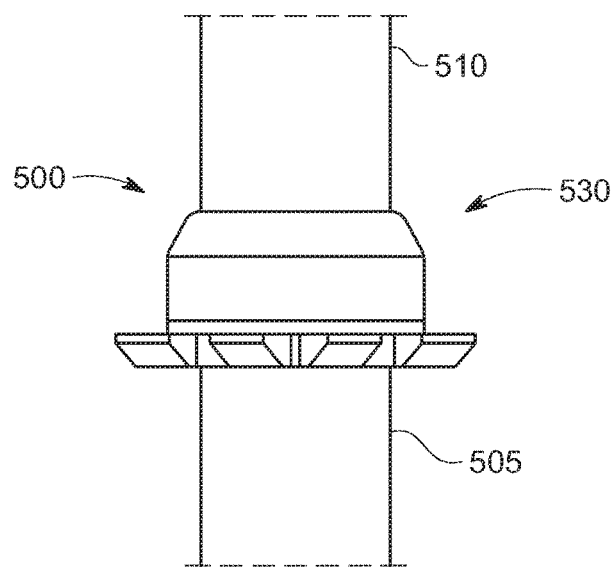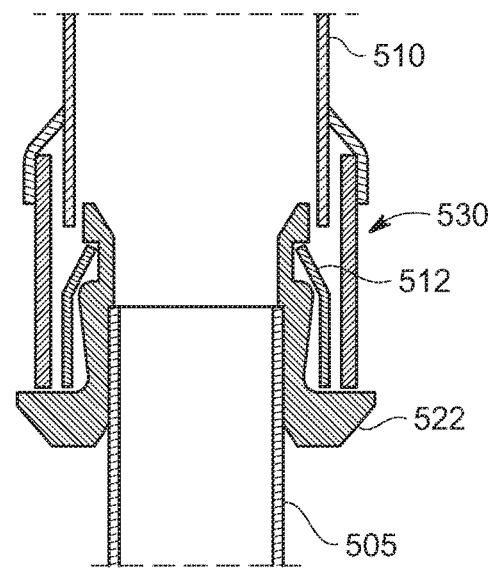
FIG. 10A  FIG. 10B
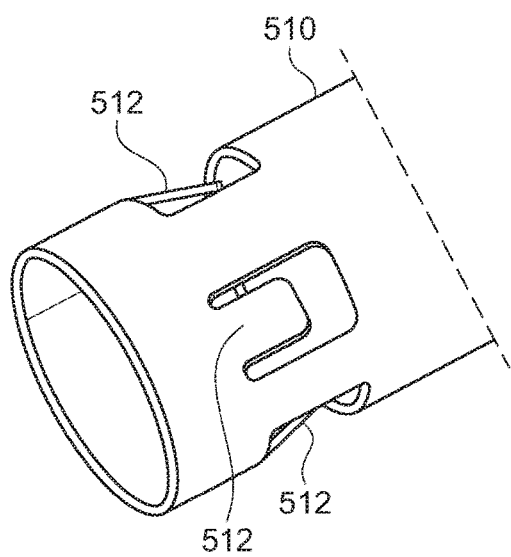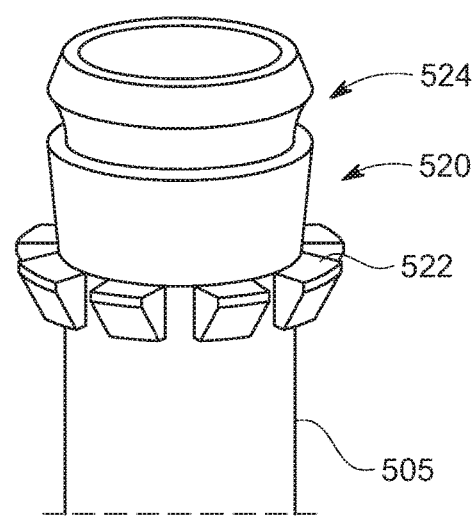
FIG. 10C  FIG. 10D

AXIALLY ADJUSTABLE CONNECTORS FOR TRUSS LEGS AND RELATED SYSTEMS AND METHODS

CROSS-REFERENCE TO RELATED APPLICATIONS

This claims priority to U.S. provisional patent application No. 62/874,516 filed on Jul. 16, 2020, titled "COUPLERS, BEARING ADAPTERS AND RELATED SYSTEMS AND METHODS FOR SUPPORTING SINGLE-AXIS TRACKERS WITH TRUSS FOUNDATIONS", and application No. 62/882,446, filed Aug. 2, 2019, titled "Systems and methods for joining axially connected truss members," the disclosures of which are hereby incorporated by reference in their entirety.

BACKGROUND

Reducing costs is critical to increasing the momentum of renewable energy relative to fossil-fuel-based energy sources. Truss foundations have the potential to save steel relative to plumb monopiles because they are able to translate lateral wind loads into axial forces of tension and compression in the legs, and therefore, may be constructed with lighter weight components and embedded to shallower depths. However, the additional complexity of constructing a multi-component truss may negate some of this advantage. In particular, joining two-piece leg components to each other and then joining the legs to apex hardware adds additional process steps that may erode some of the time savings attributable to truss foundations. Therefore, to allow A-frame-shaped truss foundations to achieve their full savings potential, the installation process must also be simple. To that end, the various embodiments of the invention provide improved systems, methods, and apparatuses for joining foundation components such as truss legs to one another and also for joining them to single-axis tracker hardware supported by the foundation components.

BRIEF DESCRIPTION OF THE DRAWINGS

FIGS. 10A-D show different views of another coupling system for foundation components according to various embodiments of the invention;

DETAILED DESCRIPTION

The following description is intended to convey a thorough understanding of the embodiments described by providing a number of specific embodiments and details involving truss foundations for single-axis trackers. It should be appreciated, however, that the present invention is not limited to these specific embodiments and details, which are exemplary only. For example, the various embodiments of the invention are easily adaptable to monopile foundations. It is further understood that one possessing ordinary skill in the art in light of known systems and methods, would appreciate the use of the invention for its intended purposes and benefits in any number of alternative embodiments, depending upon specific design and other needs.

Figure 1:
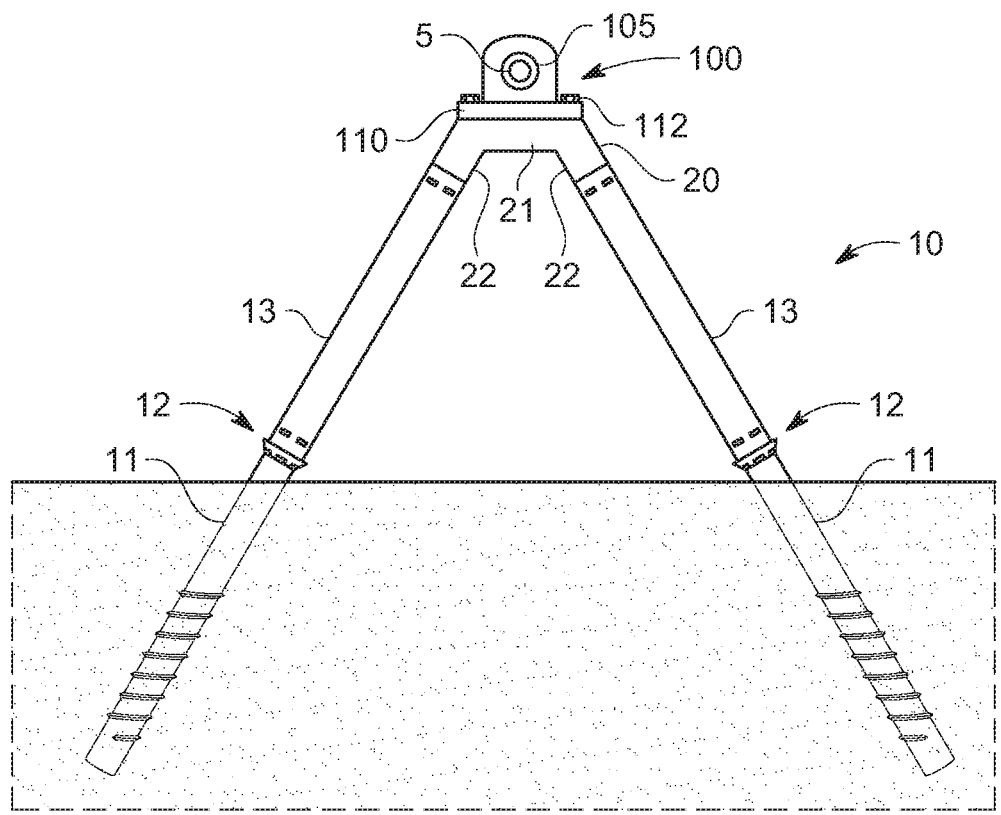
FIG. 1 shows a portion of a single-axis solar tracker supported by a truss foundation system.

Starting with FIG. 1, this figure shows a portion of a single-axis solar tracker supported by a truss foundation system. The Applicant of this disclosure has developed a novel truss-based foundation system for supporting single-axis trackers and other structures known commercial as EARTH TRUSS. As shown here, foundation system 10 includes a pair of adjacent truss legs driven partially into the ground at angles towards one another to form an A-frameshaped structure. Each leg in this exemplary system includes screw anchor portion 11 that is driven nearly entirely into the ground and upper leg portion 13. Upper leg portion 13 is connected to the upper end of screw anchor 11 to substantially extend the main axis of the screw anchor. In various embodiments, and as shown, driving coupler 12 is attached to or formed in the upper end of each screw anchor 11. Coupler 12 serves at least two functions. First, it provides features that are engaged by a rotary driver so that the screw anchor can be driven into the ground with a combination of downward force and torque. Second, the upper portion of coupler 12 is received into the bottom end of upper leg portion 13. The driving features circumscribing the coupler act as a stop to limit a depth of penetration of coupler 12 into upper leg 13. Depending on the surface geometry of the upper portion of coupler 12, it may allow for some degree of angular articulation between screw anchor 11 and the upper leg 13. This may be desirable, for example, if the actual axis of screw anchor 11 has deviated from the intended axis, resulting in misalignment of the tracker components with respect to other tracker components in the same tracker row. After the desired orientation has been achieved, a crimper or other tool may be used to pinch the upper leg against the crimp collar, above an underlying recess, so that the orientation of the upper leg is preserved and the screw anchor and upper leg are unified into a substantially unitary structure capable of resisting tensile and compressive forces.

Continuing with FIG. 1, the free end of each upper leg portion 13 is joined together with adapter 20 that completes the A-frame and provides a platform on which to attach other tracker components, such as bearing assembly 100 shown here. It should be appreciated that in other embodiments, the bearing assembly and adapter may be combined into a single structure designated in this disclosure as a bearing adapter. Bearing assembly 100 has a bearing 105 that receives torque tube so that it is free to rotate about its own axis. In this example, adapter 20 also has a pair of connecting portions 22 extending down and away from main body 21. In various embodiments, these portions 22 may have similar geometry to couplers 12, because they do not need to be driven but are instead merely inserted into the open ends of each leg, they do not include the driving features that circumscribe the couplers 12 that join screw anchors 11 and upper leg portions 13. Assuming that lateral loads dominate, bearing assembly 100 is preferably oriented so that tracker torque tube 5 passes orthogonally through the plane defined by the truss legs, that is, the legs remain orthogonal to the torque tube. Alternatively, in other tracker systems, such as that shown in FIG. 6B, the torque tube may be suspected from a bearing pin and sweep through an arc contained by the bearing adapter rather rotating about its own axis.

Figure 2:
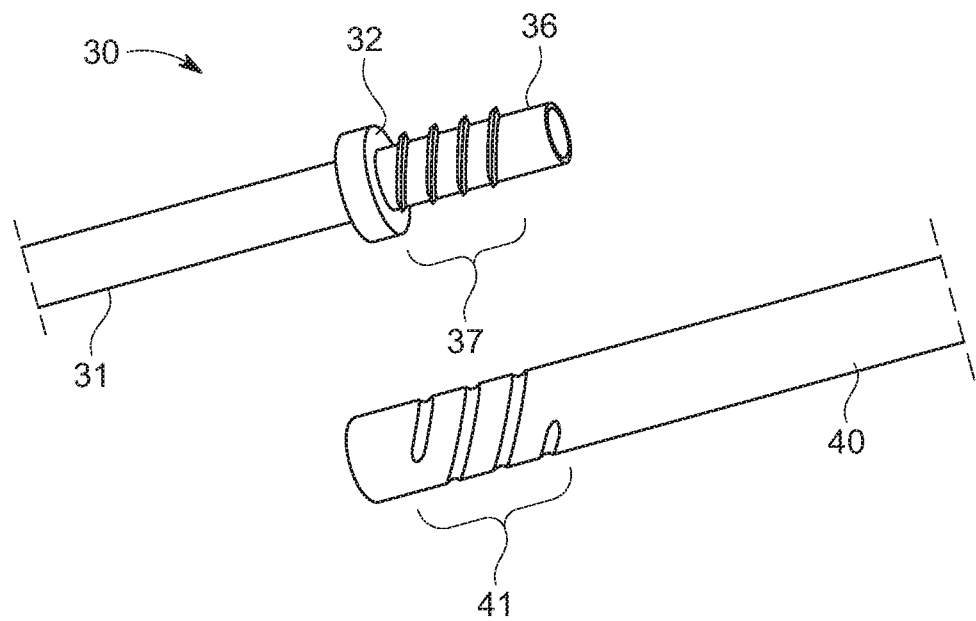
FIG. 2 is a partially exploded view showing a system for connecting truss leg components according to various embodiments of the invention.

Turning to FIG. 2, this figure shows a partially exploded view of a system for connecting truss leg components according to various embodiments of the invention. In this exemplary system, leg 30 is formed from screw anchor 31 and upper leg portion 40. Screw anchor 31 and upper leg 40 have been modified from what is shown in FIG. 1, such as by stamping, to form coarse threads 37, 41 in the top end 36 of the screw anchor 31 and bottom end of the upper leg 40, respectively. In various embodiments, upper leg 40 has a larger internal diameter than the outer diameter of screw anchor 31 enabling them to nest. Also, in various embodiments, threads 41 of upper leg may face inward, that is they have a relatively narrower inside diameter than the rest of upper leg 40 while threads 37 of screw anchor 37 are outward facing, that is, they have a relatively larger outside diameter than the rest of screw anchor 31. This is necessary to prevent mechanical interference but may also allow some of axial articulation between the two components.

In FIG. 2, retaining nut 32 has been sleeved over upper end 36 and threaded over threads 37 on screw anchor 31 until it bottoms out at the end of the threads. This may be done at the time of manufacture or later in the field. In this system, upper leg 40 is threaded over screw anchor 31 until the threads are sufficiently engaged to keep it in place. In various embodiments, upper leg 40 has fewer threads enabling the threads to serve as a method of adjusting the leg length. After adapter 20 or bearing adapter have been attached to both legs at the desired orientation and the required height achieved, the retaining nut may be threaded back up the screw anchor until it compresses against the end of the upper leg to preserve the orientation. As shown in greater detail in the remaining figures, the geometry of retaining nut 32 and coarse threads 37 enables the upper leg and screw anchor to be axially aligned or off axis within a small range (e.g., ±5-degrees) to correct for misalignment of the screw anchor during driving.

Figure 3A:
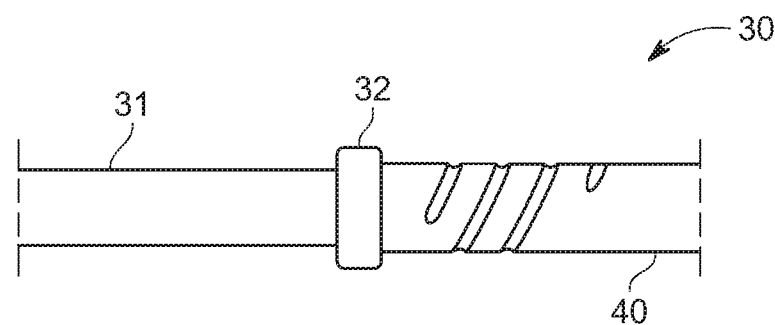
FIG. 3A is a side view of the system for connecting truss leg components shown in FIG. 2.
Figure 3B:
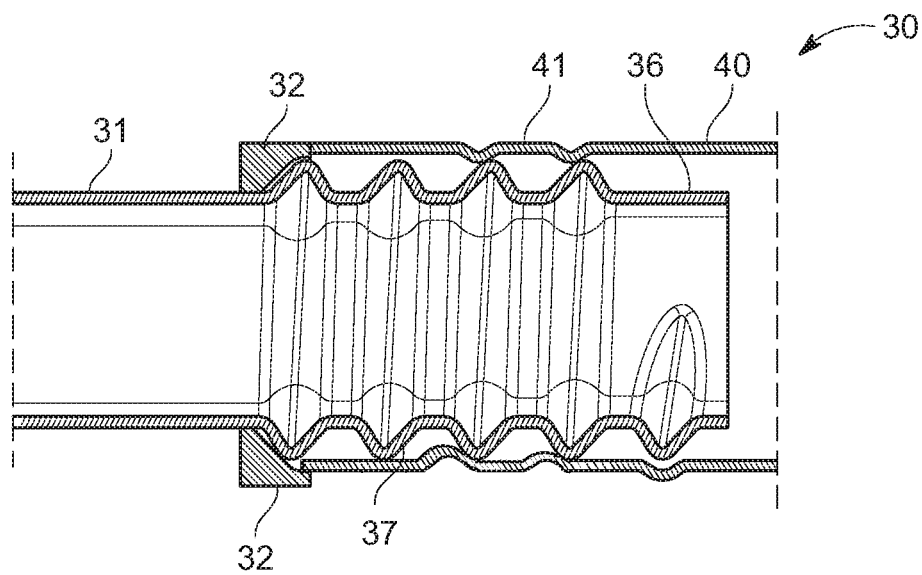
FIGS. 3B and 3C are partial cut-away views of the system for connecting truss leg components shown in FIG. 3A.
Figure 3C:
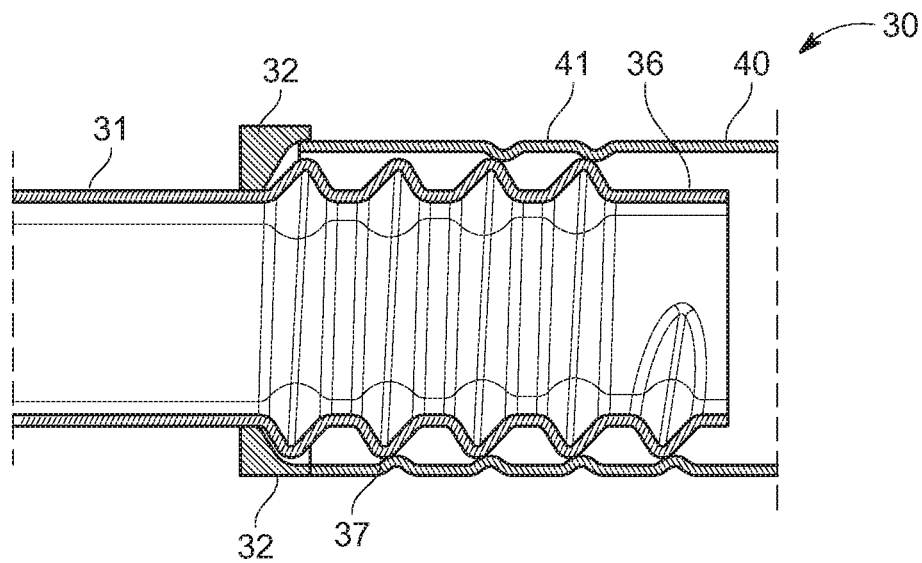

Turning to FIGS. 3A-C, FIG. 3A is a side view of the system for connecting truss leg components shown in FIG. 2 and FIGS. 3B and 3C are partial cut-away views of system for connecting truss leg components show in 3A. Starting with 3A, upper leg 40 has been threaded over screw anchor 31 so that the small number of threads 41 on upper leg engage 40 the relatively larger number of threads 37 on screw anchor 31. Once the desired axial position has been achieved, retaining nut 32 may be turned so that it travels up screw anchor's threads 37 until it achieves mechanical interference with the lower end of upper leg 40. As seen in FIGS. 3B and C, this will force the threads 41 of upper leg 40 against the threads 37 of the screw anchor 31 and provide a stable, strong connection between the two.

FIG. 3B shows a section view of the connection between screw anchor 31 and upper leg 40 when the screw anchor 31 is misaligned from its intended axis. In order to compensate for this misalignment, after upper leg 40 has been loosely threaded onto screw anchor 31, it is tilted to achieve alignment with the intended axis. When this happens, threads 41 on one side of the upper leg 40 (top-side in the picture) are spaced relatively far apart from the legs on the screw anchor and rest against the trailing edge of threads 37 of screw anchor 31, while the threads on the opposing side (lower-side in the picture) are much closer to the threads on the screw anchor, engaging the leading edges. The loose/coarse fit between them enables this angular adjustment. As a result of being offset, the bottom end of the upper leg 40 is angled with respect to a midline through screw anchor 31. If a flat nut is torqued against it, it will only contact the leg at one point—in fact, the closest point—resulting in very little resistance against wobble. To address this problem, the portion of the retaining nut used in various embodiments of the invention that contacts the bottom end of the upper leg has a concave surface. As seen in 3B, the concave leading surface of nut 32 extends further in the axial direction of the screw anchor moving radially outward. Therefore, the top side of the upper leg 40 engages retaining nut 32 at a far contact point, while the bottom-side engages it at a near contact point. In this way, upper leg 40 is fully supported in the axial direction to resist compressive loads and is fully biased against the threads of the screw anchor, albeit at different points (e.g., trailing edges versus leading edges).

Similarly, FIG. 3C is another section view of the connection between screw anchor 31 and upper leg 40 when the screw anchor 31 is misaligned from its intended axis according to various embodiments of the invention. In this example, screw anchor 31 is slightly misaligned in the opposite direction to that shown in 3B requiring that upper leg portion 40 be tilted upward in the geometry of the figure. To compensate for misalignment of the screw anchor from its intended axis, upper leg 40 is loosely threaded over threads 37 of screw anchor 31 until the desired axial position is achieved. Then, upper leg portion 40 is tilted with respect to screw anchor 31—upward in the orientation of the figure—so that upper leg threads 41 on one side (top-side in the figure) engage leading edge of screw anchor threads 37, and on the other side (bottom-side in the figure) engage the trailing edge of screw anchor threads 37. When retaining nut 32 is threaded upwards, towards upper leg 40, the concave surface will engage the upper leg at the near contact point and at the same time, it will engage the opposing portion of the lower end of the upper leg at the far contact point. The far contact point is further away in the axial direction and also further outward in the radial direction. In this way, the nut will contact the upper leg at more than one point even though it is not orthogonal to the nut or in-line with the screw anchor.

Figure 4A:
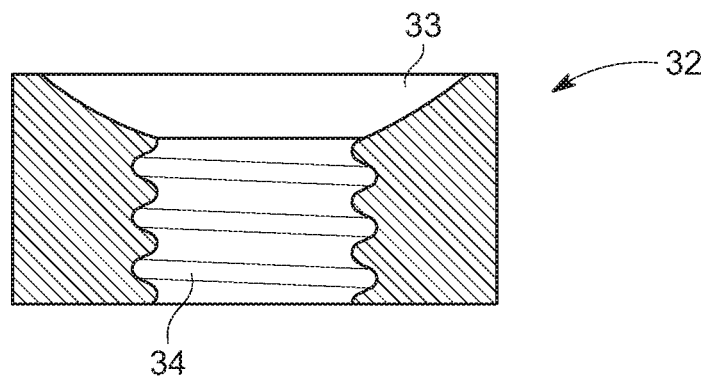
FIGS. 4A-C show various views of a retaining nut for joining truss leg components according to various embodiments of the invention.
Figure 4B:
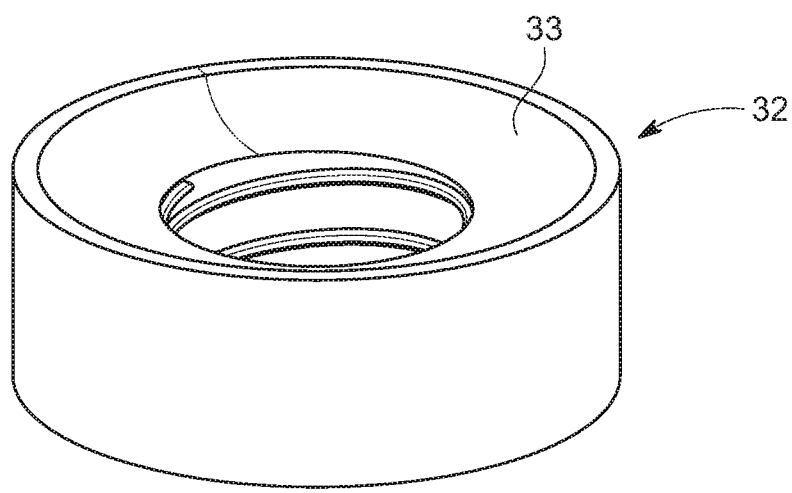
Figure 4C:
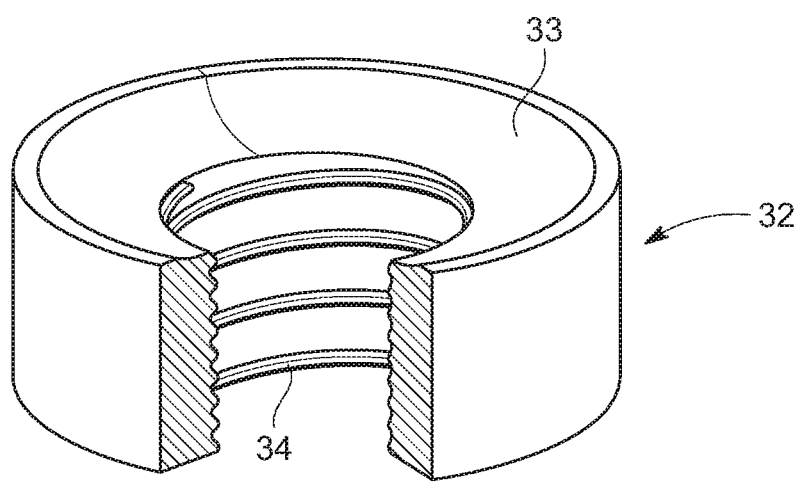

FIGS. 4A-B show various views of the retaining nut used in accordance with various embodiments of the invention; 4A is a section view, 4B is a perspective view, and 4C is a partial cut-away. As mentioned herein, the retaining nut has a concave upper (upper leg-facing) surface 33 that is able to contact the bottom end of the upper leg regardless of whether it is exactly aligned or slightly offset from the axis of the screw anchor. At the center of the convex surface 33 is a threaded opening 34 that is dimensioned to thread tightly against the threads at the top end of the screw anchor. As mentioned above, in various embodiments, retaining nut 32 may be threaded on to the screw anchor at the time of manufacture, or alternatively, in the field prior to threading on the upper leg. The outer surface of retaining nut 32 may be smooth, as shown in the figure, or may contain facets like a typical nut to enable a pipe wrench or other hand tool to be used to tighten it against the upper leg on the threads.

Figure 5:
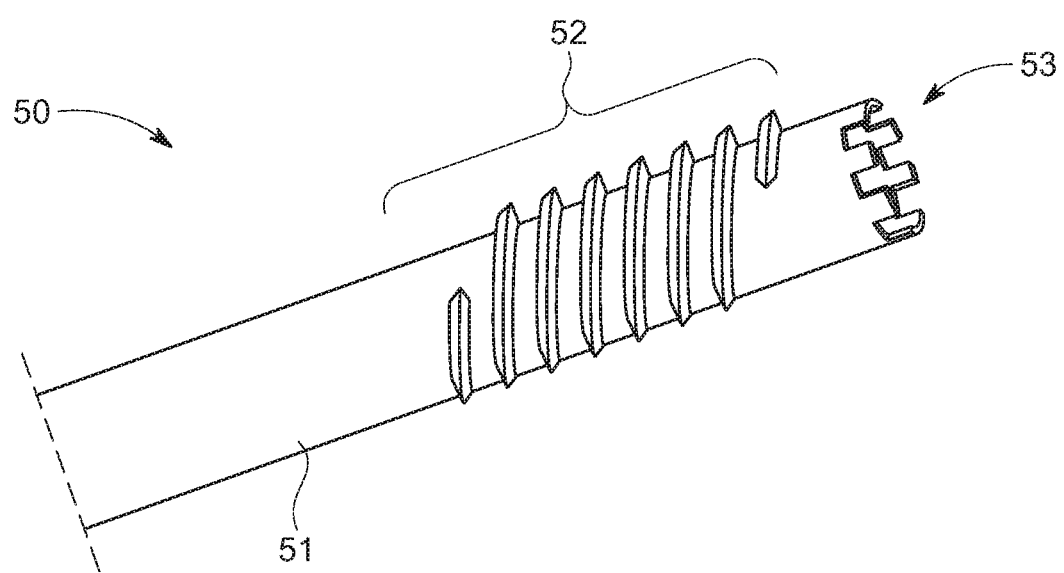
FIG. 5 shows a portion of a truss leg component with a castellated driving head according to various embodiments of the invention.

Turning now to FIG. 5, this figure shows a portion of a truss leg component 50 with castellated driving head 53 according to various embodiments of the invention. As discussed in the context of FIG. 1, in various embodiments, a collar or coupler may be welded or otherwise attached to the top end of the screw anchor to provide features that may be engaged by the head of a rotary driver to impart torque and downward force to the screw anchor without damaging it. The screw anchor must remain open at both ends so that a mandrel, drill, or other tool may be inserted into it while it is being driven into the ground. If the anchor is modified to include stamped threads, such as in FIGS. 3A-C, engaging the stamped threads may not be a good option because it may deform them making them unusable to engage with the upper leg. Therefore, in the embodiment shown in FIG. 5, a set of features or teeth 53 have been cut into the top end of shaft 51 of screw anchor 50 to approximate the geometry of a castle nut above threads 52. The head or chuck of the rotary driver may have reciprocal feature built into it to enable it to drive screw anchor 50 quickly and easily with minimal deformation. In various embodiments, the chuck may also have a rounded insert or ring that first into the open end of the screw anchor to preserve the rounded cross section when subjected to the large forces imparted during driving. It should be appreciated that other stamped or cut shapes may also be used in place of the castle nut geometry shown in the figure.

Figure 6A:
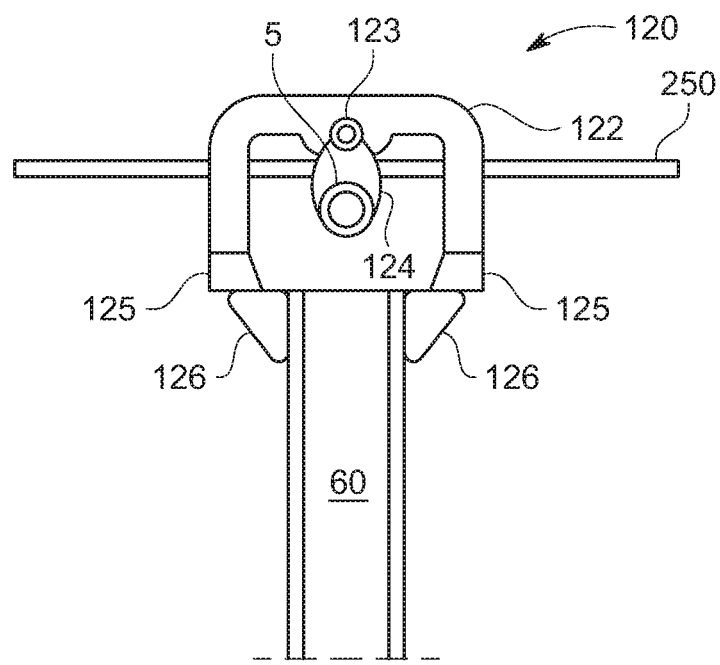
FIG. 6A shows a portion of a conventional top-down tracker supported by a monopile foundation.

Turning now to FIG. 6A, this figure shows a portion of a conventional top-down or offset style tracker supported by a monopile foundation. Tracker 120 shown here is from NEXTRACKER, INC. of Fremont, Calif. and is sold under the name NX SERIES. In such a top-down or mechanically balanced tracker, torque tube 5 is suspended from a bearing pin 123 seated in bearing housing assembly 122 via bracket 124 above. As a result, the drive motor causes torque tube 5 to swing through and arc rather than rotate in place. Bearing housing assembly 122 has a pair of feet portions 125 that sit on right angle bracket 126. Tracker 120 is supported by a single conventional W6×9 or W6×12 H-pile 60. Right angle brackets 126 are a NEXTRACKER adaptation to provide a wider stance for their bearing housing assembly 122 so that the tracker doesn't require a different foundation than other conventional styles of trackers, such as, for example, the aforementioned bottom-up designs where the bearing surrounds the torque tube. When using a conventional monopile foundation like that shown in FIG. 1A, lateral loads on the tracker from wind striking the array are translated into H-pile 60 as a bending moment. Therefore, the H-pile must be oversized and driven deeply to resist this bending moment.

Figure 6B:
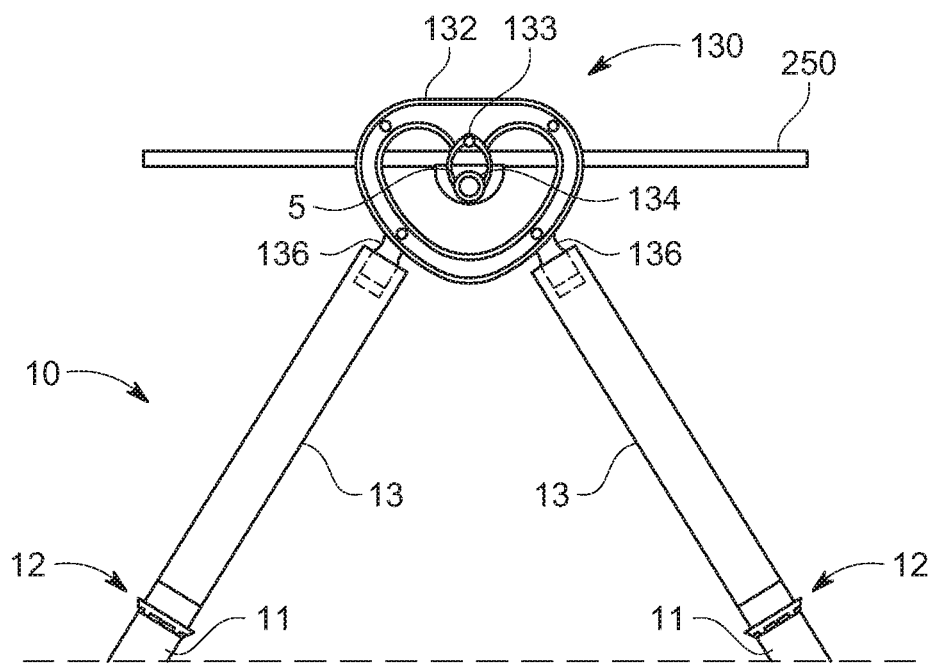
FIG. 6B shows a portion of another top-down tracker supported by a truss foundation according to various embodiments of the invention.

FIG. 6B shows a portion of another single-axis tracker supported by an EARTH TRUSS foundation in accordance with various embodiments of the invention. As shown, the EARTH TRUSS foundation consists of a pair of adjacent legs driven to lean towards one another and joined at the top with a bearing adapter. As used herein, in contrast to the bearing housing assembly of FIG. 6A, the term "bearing adapter" is used to refer to a structure the combines the function of a bearing (e.g., rotatably receiving a rotating member to limits its motion to rotation) with that of an adapter (e.g., structure that joins a pair of truss legs). In the EARTH TRUSS system shown in FIG. 6B, each truss leg 10 consists of screw anchor 11 driven most of the way into the ground, and upper leg 13 joined to the above-ground end with coupler 12, as with the foundation shown in and described in the context of FIG. 1. Tracker 130 shown here includes bearing adapter 132 that includes a pair of welded on coupler or connecting portions 136 that are inserted into respective upper leg portions to provide some degree of axial and angular adjustment between upper legs 10 and adapter 132. In various embodiments, assembly is completed by sleeving upper legs 13 over couplers 12 and at the end of each screw anchor 11 and by inserting the bearing adapter's connecting portions 136 in the opposing end of each leg 13. While these four connection points are still loose, there is enough play for these connections to be made without mechanical interference. Then, once the bearing adapter's height and orientation are aligned with the other bearing adapters in the same row, each upper leg 13 may be crimped above the respective couplers 12 to lock the legs 13 to the screw anchors 11 and bearing adapter 132 respectively, preserving the desired position of the bearing adapter.

As shown, bearing adapter 132 has a generally cardioid-shaped body with a bearing 133 that receives a bearing pin. Torque tube 5 hangs from the bearing pin via a torque tube support bracket 134 extending on either side of bearing adapter 132. With this type of top-down design, as well as that shown in FIG. 1A, lateral loads are transferred from the tracker to the foundation via the bearing. However, in the case of the truss foundation 10 shown in FIG. 6B, these forces are translated into axial forces of tension and compression rather than bending. Because single structural members are good at resisting axial forces, relative to their ability to resist bending forces, smaller scale components may be used with less deep driving depths.

It should be appreciated that the bearing adapter shown in FIG. 6B is one example of an optimized bearing adapter for joining a top-down or offset type tracker to a truss foundation. Other designs, such as those shown herein, are also possible. This particular example is formed using two identical pieces of stamped metal that are pressed together with a press joint or clinch joint, where two pieces of metal are pressed together with a punch and die. The result is a rounded recess with a slight undercut flow that holds the pieces together without requiring welding or rivets. This requires less energy and costs less than other methods of joining metal.

Figure 6C:
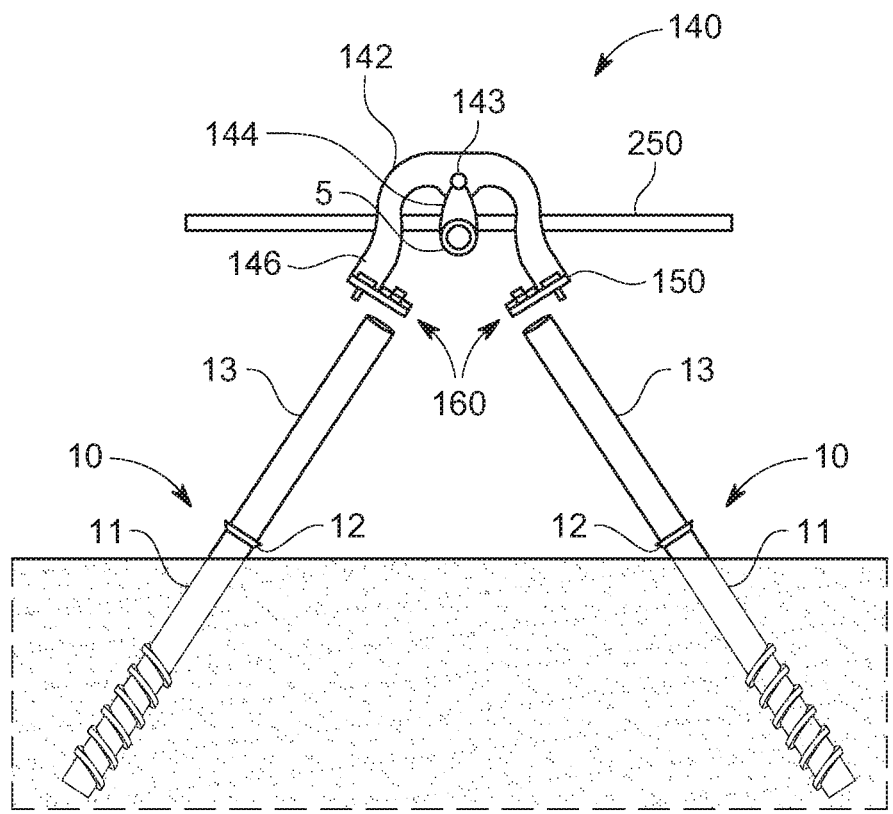
FIG. 6C shows a portion of an additional single-axis tracker supported by a truss foundation with an axially adjustable connection according to various embodiments of the invention.
Figure 6C:
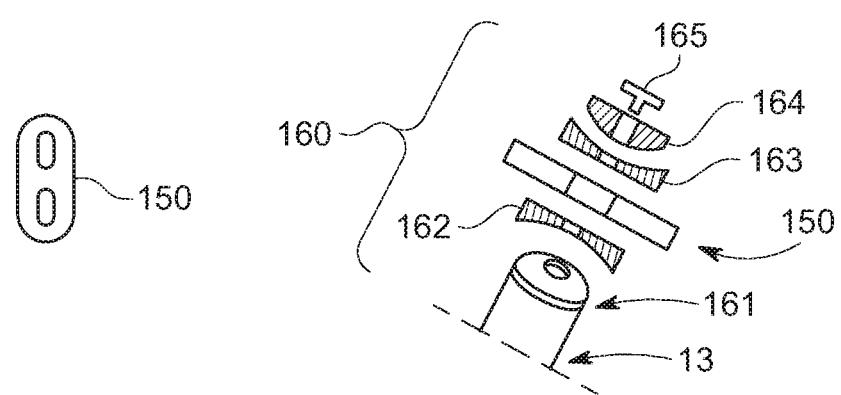

Turning now to FIG. 6C, this figure shows aa portion of an additional single-axis tracker 140 supported by a truss foundation 10 according to various embodiments of the invention. Tracker 140 shown here is another top-down design. Bearing adapter 142 has arms 146 that are symmetric about a midline of adapter 142. Instead of inserting into the open ends of upper leg portions 13, bearing adapter 142 is attached to legs 13 via plates 150 and bolt and wedge assemblies 160. Bearing 143 is formed at the approximate center of bearing adapter 142 to provide a rotational axis for the torque tube. Bearing 143 receives a rotating pin that supports torque tube hanger 144. Tube hanger 144 holds torque tube 5 at a fixed distance relative to bearing 143, regardless of the panels' orientation. As solar panels 250 attached to the torque tube 5 move from an East-facing orientation to a West-facing one, torque tube 5 swings like a pendulum about bearing 143 within the opening defined by bearing adapter 142.

Truss foundation 10 consists of a pair of legs that, in this example, are formed from screw anchors 11 and upper legs 13 that joined substantially end-to-end via couplers 12, a threaded connection, crimping, or other form of mechanical engagement. As shown in the detail figure (bottom), each leg portions 13 terminates in convex fitting 161. Fitting 161 may be cast, stamped, or otherwise formed and threaded or welded so that it covers and/or sits inside the top end of each upper leg 13. In various embodiments, fitting 161 may have a threaded opening, as shown in the figure. In other embodiments, as shown in the context of FIGS. 11A-E, there may be a bolt and wedge assembly inside each upper leg 13 that secures the tracker system to each leg. As shown, bolt and washer assemblies 160 couple legs 13 to bearing adapter 40 via support plates 150 to each upper leg 111. In various embodiments, bolt and washer assembly 160 consists of a pair of concave washers 162/163 that pinch tracker support plate 150. On the bottom side, the concave washer 162 fits against the convex surface of fitting 161. On the top side, second washer 164 that is convex on its lower side and flat on the upper is received within upper concave washer 163 and retention bolt 165 passes through the entire assembly starting with convex washer 164, upper concave washer 163, support plate 150, lower concave washer 162 and into the threaded opening in convex fitting 161 at the top of upper leg 22. In various embodiments, holes through upper and lower concave washers 163, 162 as well as support plate 150 may be oversized to permit the orientation of support plate 150 to be adjusted relative to upper legs 22 to compensate for any misalignment. For example, if one or both legs 13 are off of their intended axis it may be necessary to adjust support plate 150 to be at a non-orthogonal orientation with respect to one or both legs. Bolt and wedge assemblies 160 will provide this flexibility. Also, as discussed above, bolt 165 may engage additional hardware concealed within upper leg 13, such as that shown in FIGS. 11A-E. Tracker support plates 150 provide the physical interface between the truss foundation and tracker system 150 and translate the load of tracker 140 into the truss legs. It should be appreciated that although exemplary tracker system 140 shown in FIG. 6C is a top-down style tracker whereby the torque tube is suspended from above rather than directly supported from below as is most often the case, the various embodiments of the invention are also compatible with bottom-up trackers where the torque tube rotates about its own axis and is supported from below.

Continuing with FIG. 6C, a second bolt may also pass through tracker support plate 150 into bearing adapter 142. Alternatively, bearing adapter 142 may have bolts projecting out of end portions. Because tracker 140 is a top-down design, it is not necessary to join truss legs separately below the torque tube. Eliminating a leg-to-leg connection below the torque tube allows for additional material savings relative to bottom-up trackers, such as that shown in FIG. 7.

Figure 7:
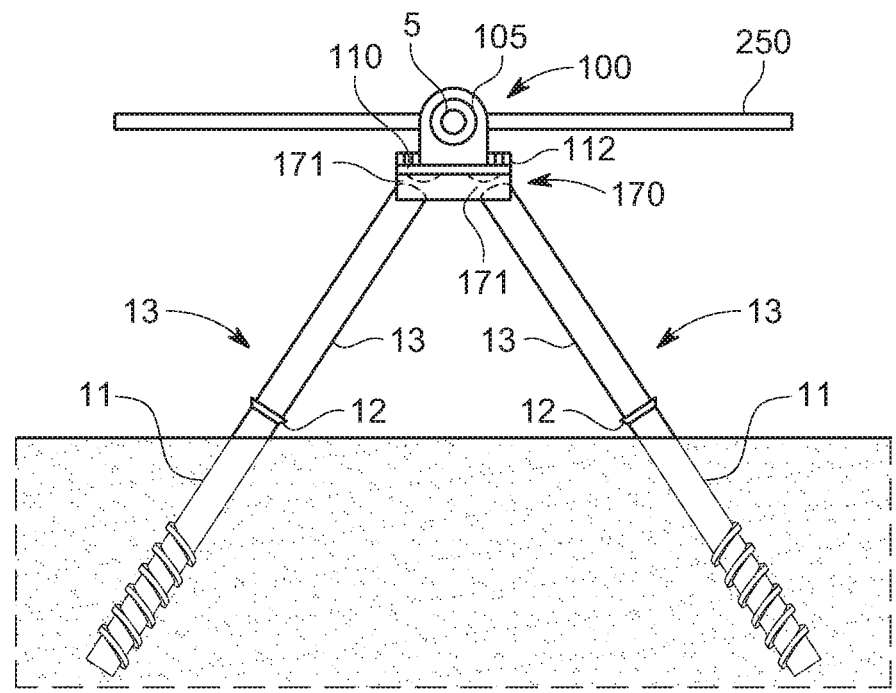
FIG. 7 shows a truss foundation supporting a conventional bottom-up tracker with an angularly adjustable adapter plate according to various embodiments of the invention.
Figure 7:
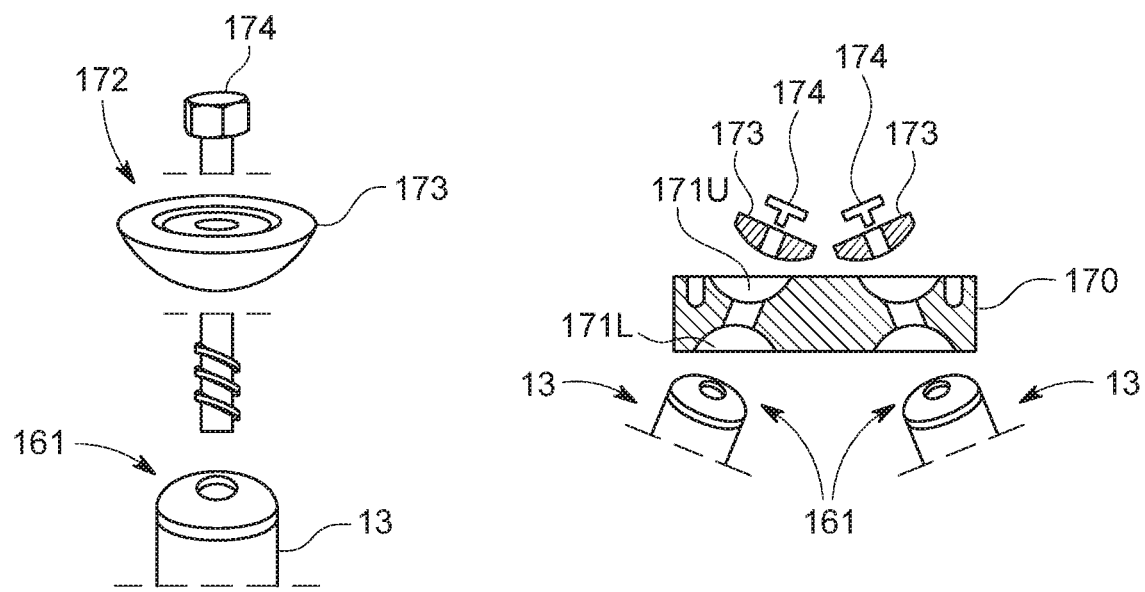

Turning to FIG. 7, this figure shows truss foundation 100 supporting a conventional bottom-up tracker like that shown in FIG. 1. The truss shown here is formed from a pair of adjacent legs consisting of screw anchors 11 joined to upper legs 13 and therefore is substantially the same as that shown in FIG. 1. Each upper leg portion 13 includes convex fittings 161 with a threaded opening at the apex. In this example, the legs are joined prior to engaging with the tracker system. This is accomplished via adapter plate 170 and bolt and washer assemblies 172. In various embodiments, and as shown in FIG. 7, adapter plate 170 includes two-pairs of axially aligned hemispherical openings that are interconnected via channels so that they extend all the way through the adapter plate 170. In various embodiments, they are centered about respective axes that are angled to match the intended angle of each truss leg. Convex fittings 161 on each leg 13 will fit into one of the hemispherical cavities 171L formed on the underside of adapter plate 170. Then, bolt and washer assemblies 172 are placed in the hemispherical openings 171U on the top side of adapter plate 170 and bolts 174 are passed through the entire thickness of adapter plate 170 and into the threaded openings in convex fittings 161. In various embodiments, the bolt and washer assemblies 172 may be adjusted so that the top surface of adapter plate 170 is leveled before adjusting the bolts to the final torque specification. After that, the tracker system may be installed. In the example of FIG. 7, this includes bearing assembly 100 with base 110 and bearing 105 supporting torque tube 5. In various embodiments, adapter plate 170 includes additional threaded holes formed in its upper surface to receive bolts such as bolts 112 that secure base 110 to adapter plate 170. Bearing 105 receives torque tube 5 so that it is held in place axially but free to rotate about its axis. Though not shown, bearing assembly 100 and in particular, bearing 105 may be made of two or more pieces to make it easier to set torque tube 5 within the bearing. Then, solar panels 250 are attached to the torque tube using brackets or other suitable fasteners. It should be appreciated that the lower hemispherical recesses 171L in adapter plate 170 may be omitted and instead a replaced with a concave lower washer such as that included with bolt and washer assembly 160 of FIG. 6C.

Figure 8A:
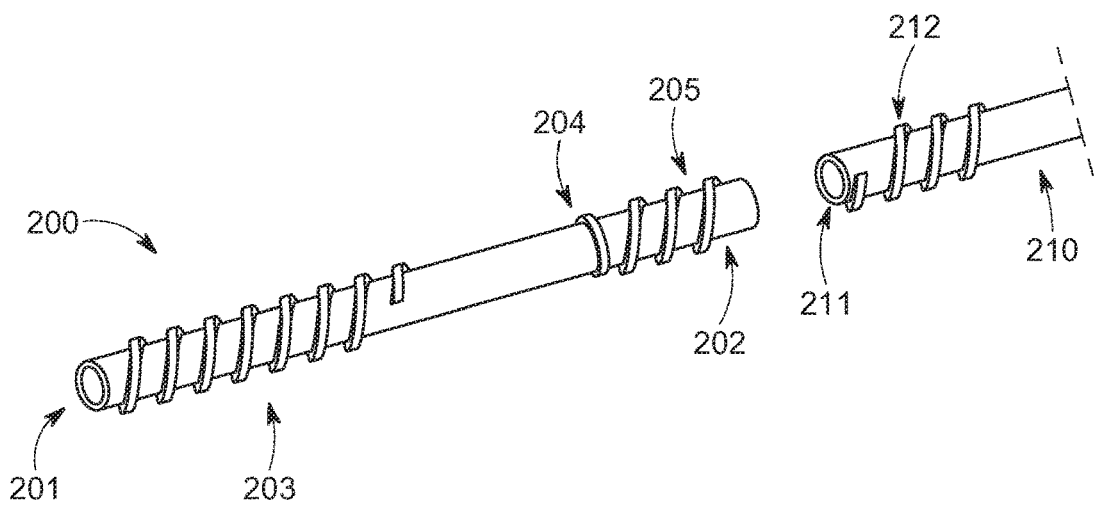
FIGS. 8A-C show systems for joining foundation components together according to various embodiments of the invention.
Figure 8B:
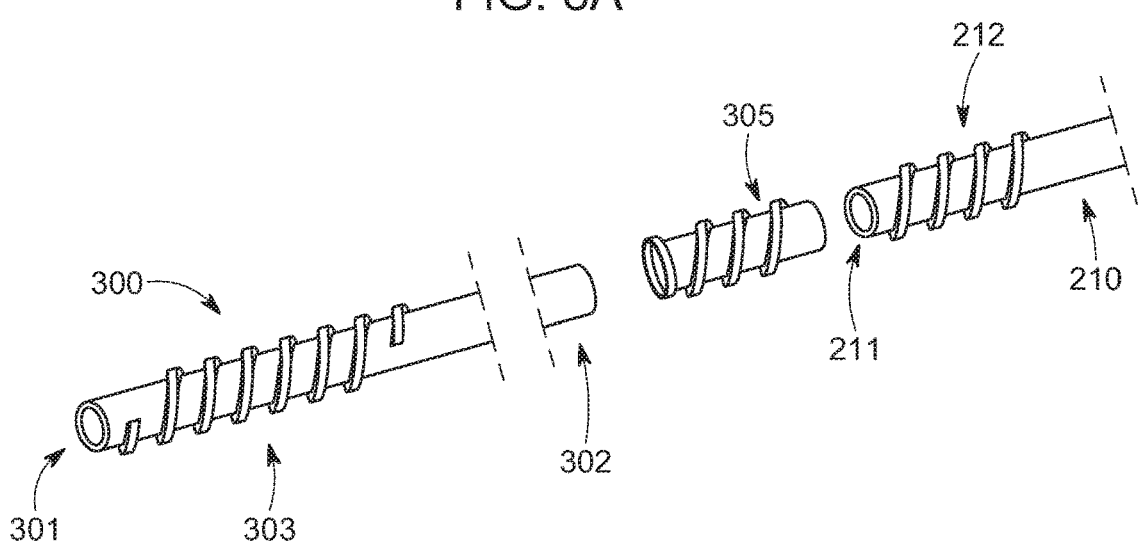
Figure 8C:
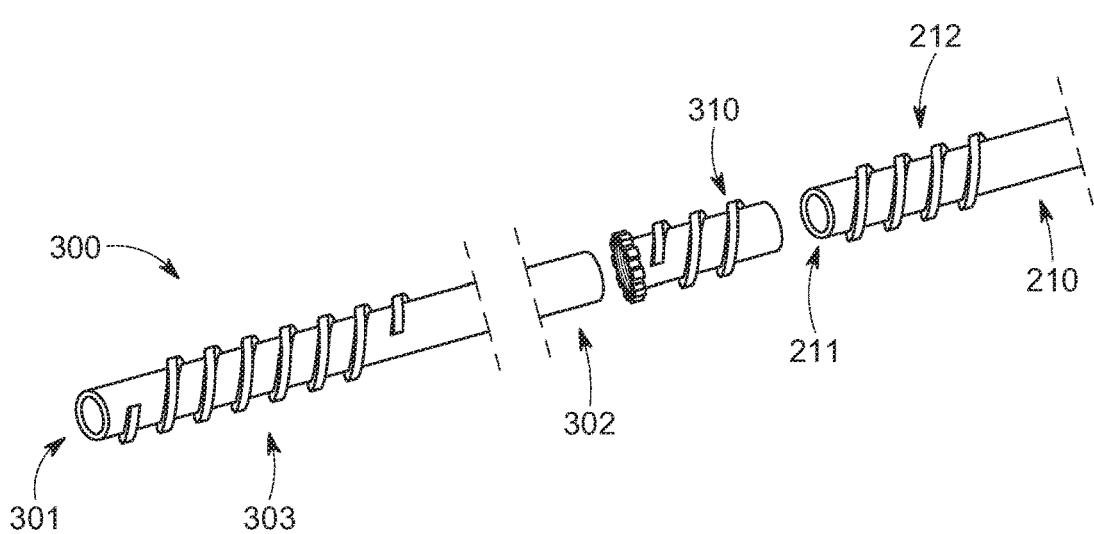

Turning now to FIGS. 8A-C, these figures show systems for joining foundation components together according to various embodiments of the invention. Starting with FIG. 8A, the system shown here includes screw anchor 200 with lower end 201 and upper end 202. External threads 203 are formed at lower end 201. Upper end 202 includes stop 204 and stamped threads 205. It should be appreciated that stop 204 is optional. In various embodiments, the end of the threads may function as a stop since the upper leg may be threaded on by hand, rather than under the power of a hydraulic machine. Upper leg 210 has a matching stamped thread pattern 212 at its lower end 211. The upper end of upper leg 210 has been intentionally omitted form the figure. In various embodiments, upper leg 210 has a larger inside diameter than the outside diameter of screw anchor 200, allowing it to be threaded onto screw anchor 200 via contact between threads 205 and 212 until upper leg 210 bottoms out against stop 204. It should be appreciated that threads 212 on upper leg 210 may be project inwards versus outwards, as show, for example, in the context of FIGS. 2 and 3A-C. Also, stop 204 may be a stamped feature, or alternatively may be welded, bolted, or otherwise attached to screw anchor 200. This may be done manually by an installer after screw anchor 200 is driven into the ground or may be done with the assistance of a pipe wrench or other tool, or with the assistance of a machine.

FIG. 8B shows a similar system where threads 205 have been replaced with threaded coupler 305. In this system, screw anchor 300 has an external thread form 303 at its lower end while upper end 302 is smooth. Threaded coupler 305 is slid over upper end 302 and welded or otherwise attached in place. Upper leg 210 is substantially the same as that shown in 3A. Upper leg 210 is coupled to screw anchor by sleeving lower end 211 of upper leg 210 over coupler 305 and rotating it so that threads 212 engage the threads formed on coupler 305. Coupler 305 includes an integrated stop to prevent damages to the threads.

FIG. 8C shows another similar system according to various embodiments. Screw anchor 300 is substantially the same as that shown in 3B with external thread form 303 at lower end 301. Driving coupler 310 is sleeved over upper end 302 and welded or otherwise fixed to the upper end. Driving coupler 310 includes a series of facets circumscribing its outer surface. In various embodiments, these features mate with the chuck of a rotary driver to transfer torque to screw anchor 300 during driving. A nipple extends above the facets, away from the screw anchor, that includes a series of threads. In various embodiments, driving coupler 310 is a cast piece. In other embodiments, it may be cold formed and welded. In still further embodiments, it may be formed from a combination of these. After screw anchor 300 has been driven to the desired depth, upper leg 210 is sleeved over coupler 310 and rotated in place so that threads 212 in the lower end 211 of upper leg 210 engage the external threads on coupler 310. The facets circumscribing coupler 310 function as a stop for upper leg 210 to bottom out against before damaging the threads on either upper leg 210 or coupler 310.

Figure 8D:
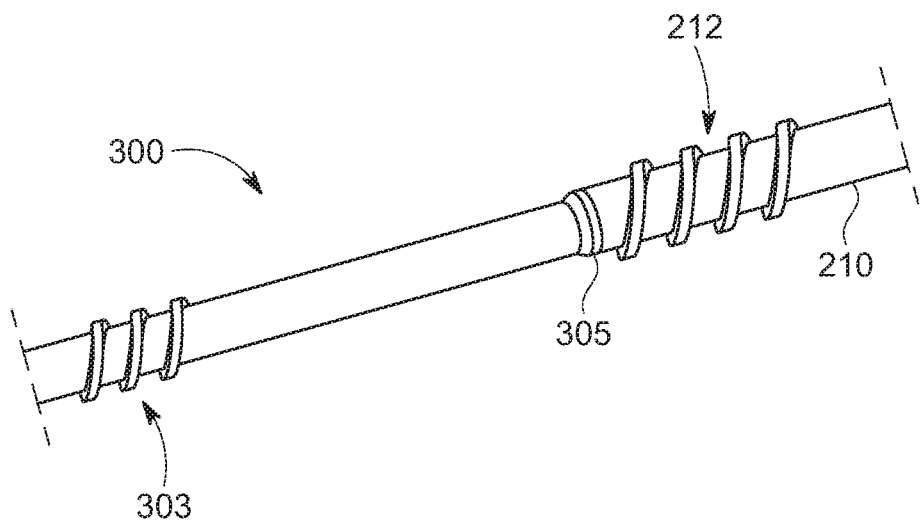
FIGS. 8D and E are close-up and section views representative of the systems shown in FIGS. 8A-C.
Figure 8E:
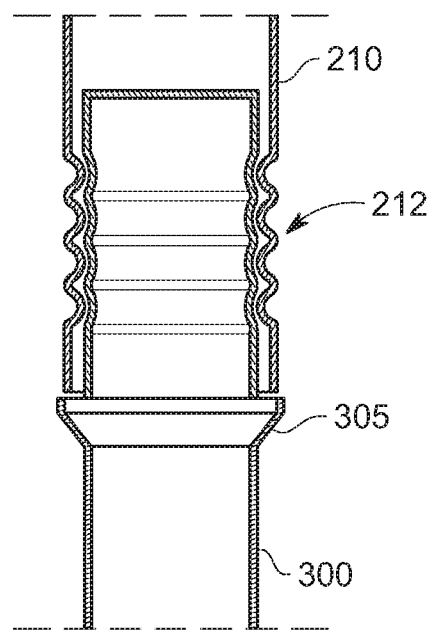

FIGS. 8D and 8E are close-up and section views representative of any of the connections shown in 3A, B or C. As seen in 3E in particular, threads in the upper leg engage threads in the screw anchor or in a coupler attached to the screw anchor to secure the two components together end-to-end without damaging the threads on either component.

Figure 9A:
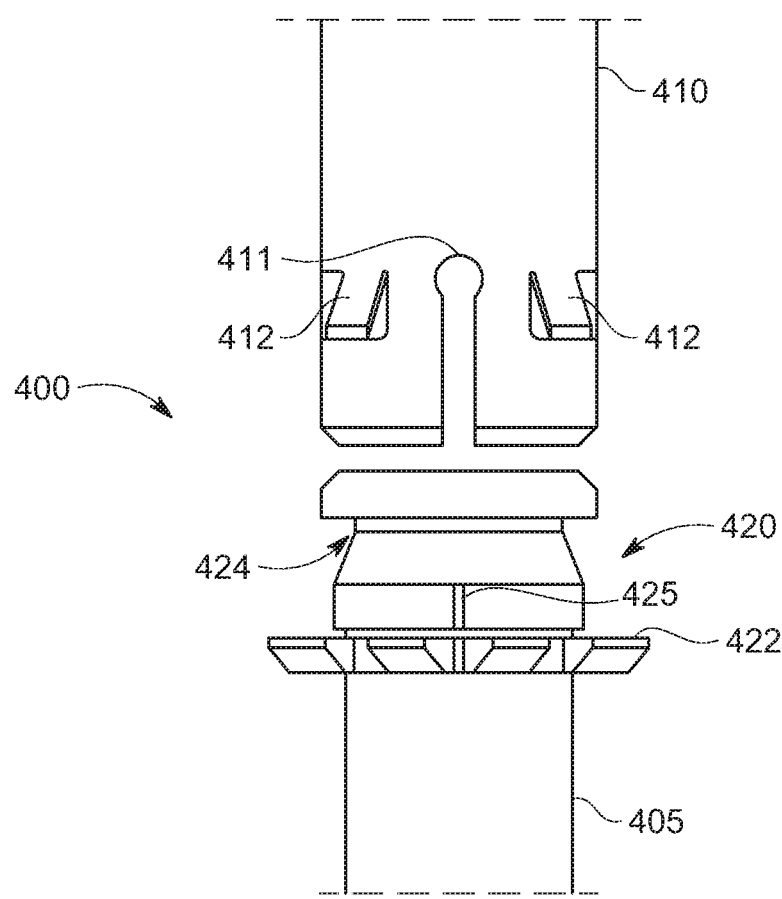
FIGS. 9A and B show two views of a coupling system for joining truss leg components according to various embodiments of the invention.

Turning now to FIGS. 9A and B, these figures show two views of a coupling system for joining truss leg components to form a unitary truss leg 400 according to various embodiments of the invention. In these figures, screw anchor 405 is joined to upper leg 410, however, it should be appreciated that this system could also be used to join the upper leg to other apex hardware or tracker system components. Upper leg 410 is a standard section of tube that has been modified to include a series of tabs 412 pointing inward, formed at locations spaced around the circumference of the lower end of the upper leg 410. The end of the upper leg has been swaged or tapered to reduce its diameter. Also, two or more axial slots 411 have been cut into upper leg 410 to allow it to radially expand and contract as well as to orient it with respect to anchor 405 and to prevent rotation.

Figure 9B:
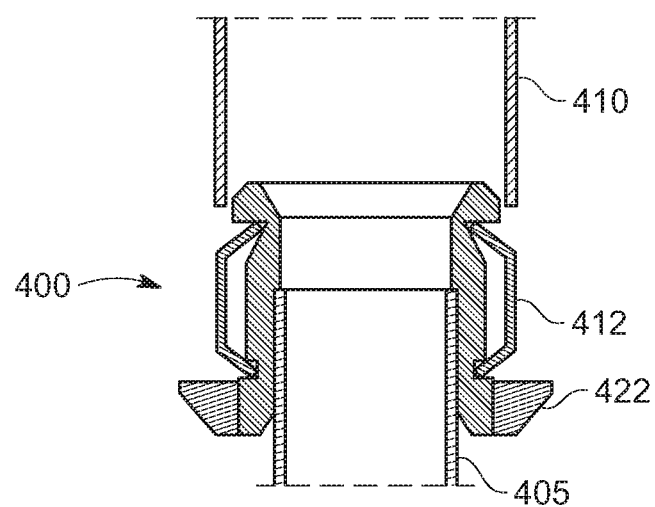

Screw anchor 405 has driving coupler 420 attached to its upper end. In various embodiment, driving coupler 420 has features formed in it, such as facets 422 shown in 9A, that positively engage with features formed on the driving head or chuck of a rotary driver to enable the driver to impart torque to screw anchor 405. These driving features 422 also form a ledge or stop to limit the extent of penetration into upper leg 410. Extending away from ledge 422 is a nipple portion that includes at least one ridge 425 and recess 424. In various embodiments, ridge 425 is received in slot 411 formed in the upper leg to prevent rotation and keep it axially aligned. When upper leg 410 is initially sleeved over coupler 420, tabs 412 are elastically deformed outward until they clear the ring and reach channel 424 where the tabs 412 can flex back inward to their natural positions, locking upper leg 410 in place. Compressive forces on the truss leg will push the upper leg portion 410 against the ledge formed by the driving features 422, while tensile forces are resisted by tabs 412 seated in channel 424 as well as the swaged lower end of anchor 410 being received in the recess just above driving features 422. FIG. 9B is a section view that shows the fitment between tabs 412 coupler 420.

FIGS. 10A-D show different views of another coupling system for joining foundation components according to various embodiments of the invention. Like the system 400 shown in FIGS. 9A and B, system 500 shown in these figures also relies on driving coupler 420 attached to the upper end of screw anchor 505 with driving features 522 that are engaged by a rotary driver. In addition, driving coupler 520 has a coupling portion that extends upward, away from the screw anchor that includes channel 524. It lacks the recessed portion just above driving features 522. Consequently, the lower end upper leg 510 need not be tapered or swaged. Instead, tabs 512 alone resist tension in the truss leg after these components are joined. In addition, cover plate 530, with an optional ethylene propylene diene monomer (EPDM) rubber collar is sleeved over the upper leg, starting at the upper end, unit it rests against the top of the driving features. This will protect the tabbed connection from exposure to elements and add additional resistance to bending moments that may otherwise dislodge the tabs from the recess formed in the coupler. Also, the optional EPDM sleeve may protect this connection from water. It should be appreciated that EPDM is simply one possible formulation and that various other UV and temperature stable formulations may be used.

Turning to FIGS. 11A-E, these figures show a coupling system for joining truss legs to single-axis tracker system according to various embodiments of the invention. The system shown in these figures is particularly well-suited to connections at the top of the leg where there is access above the upper leg. 11A shows an upper portion of a single-axis tracker 600 including bearing 606 supported by bearing adapter 610 and connected to upper legs 13 via bolt and wedge assembly 620. Bearing adapter 610 joins the free ends of each truss leg to form a rigid A-frame and also provides a mounting platform for bearing 605.

Figure 11A:
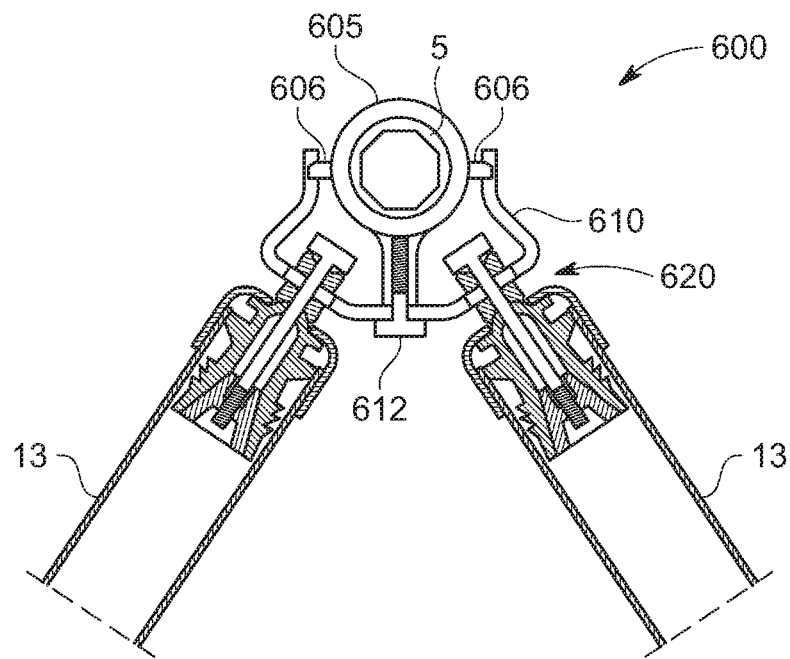
FIGS. 11A-E show a coupling system for joining truss legs to a single-axis tracker system according to various embodiments of the invention.
Figure 11B:
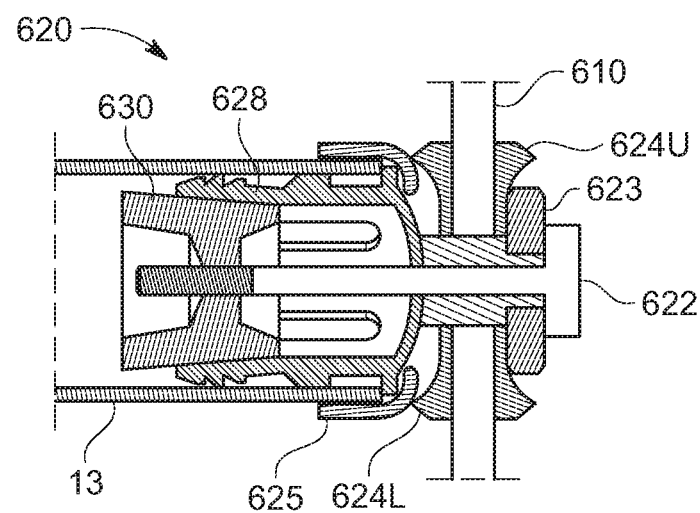

Generally speaking, the top of each truss leg provides unique fitment challenges relative to monopiles because of interference. The angled legs make it difficult to simultaneously slide a symmetric, one-piece structure over or into both upper legs because of mechanical interference unless the leg components are loose. The wedge and bolt connection system 620 shown in FIGS. 11A and B overcomes this challenge while still providing axial and angular adjustment between legs 23 and the bearing adapter 610. 11B shows the components of system 620 in greater detail. Tensioning bolt 622 passes through a convex washer 623 that is seated in an upper concave washer 624U. Upper concave washer 624U is flat on its bottom side to rest against the flat surface of bearing adapter 610. Below bearing adapter 610 is second convex washer 624L that is flat on the side facing the bearing adapter and convex on the opposing side facing the upper leg. This concave surface of lower concave washer 624L engages the convex top of expansion clamp 628 projecting through open protective cover 625. FIG. 11B shows the bolt and wedge assembly stack-up in the compressed position when inserted in an upper leg.

Figure 11C:
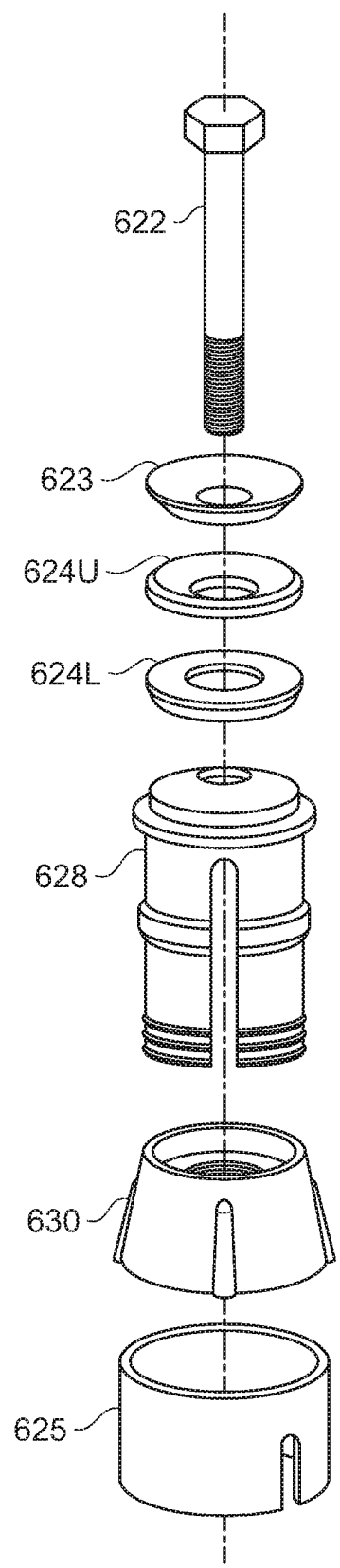
Figure 11D:
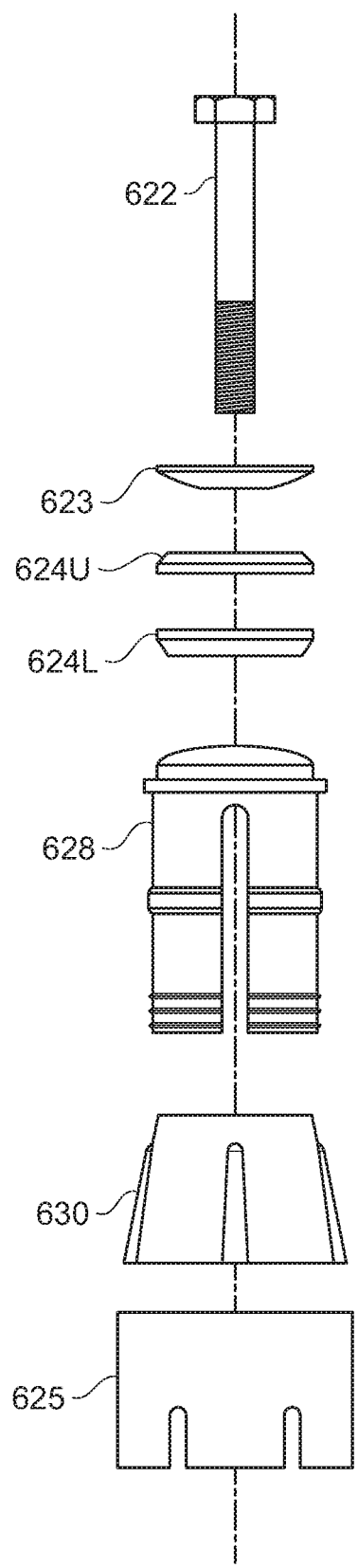
Figure 11E:
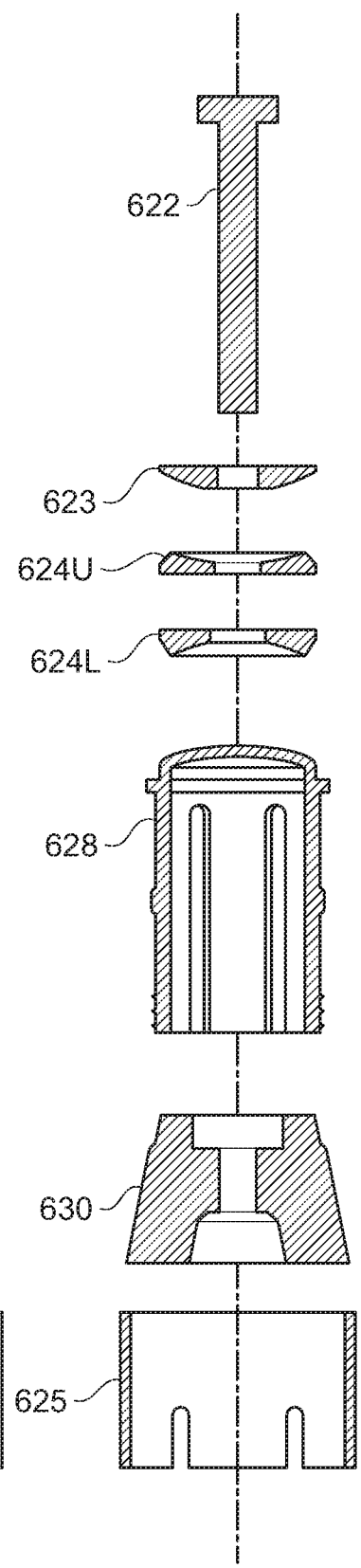

FIGS. 11C-E show the same components in three different exploded views, perspective, front and section. Continuing with the description of assembly 620 of 11b, wedge 630 is located below expansion clamp 628. In various embodiments, there may be a dimple or other feature inside upper leg 13 that prevents wedge 630 or claim 628 from falling through the upper leg 13 and keeps them at the desired position inside the leg. Cover 625 fits over the open end of the leg 13 so that the convex upper surface of expansion clamp 628 projects through the cover, above the upper leg. Once this is in place, which could be during manufacture or at some point prior to deliver to the job site, or, alternatively, at the job site, in various embodiments, retention bolt 622 is threaded through convex washer 623, upper concave washer 624U, through bearing adapter 610, through lower concave washer 624L, and into the opening at the dome-shaped top of the expansion clamp 628 until it engages the threaded opening in the wedge 630. In some embodiments, all of these components may be attached bearing adapter 610 prior to delivery at the job site. In other embodiments, only retention bolt 622 and washers 623, 624U, and 624L are attached while the remaining components are attached to upper leg 13. In still further embodiments, bolt and wedge assembly 620 will be assembled to itself and then taken apart at the job site so that cover 625, wedge 630 and expansion clamp 628 may be inserted into and/or over each upper leg 13 and the remaining components attached to bearing adapter 610. Once bearing adapter 610 is leveled and aligned, retention bolts 622 may be tightened to preserve the orientation. Then, bearing 605 may be attached to the bearing adapter 610. A bolt positioned underneath the bearing adapter 610 may be received in a threaded opening in the bearing 605 to enable vertical adjustment.

Figure 12A:
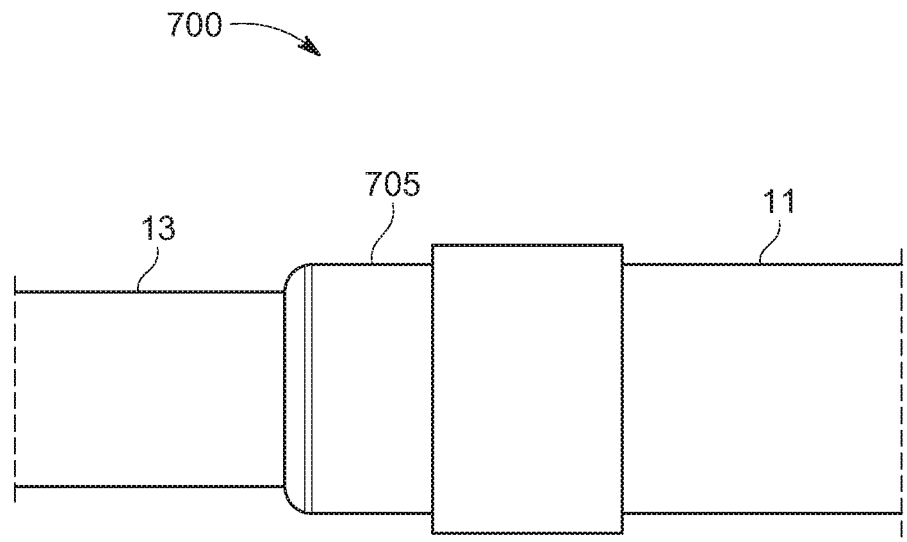
FIGS. 12A-C show another system for joining truss leg components according to various embodiments of the invention.
Figure 12B:
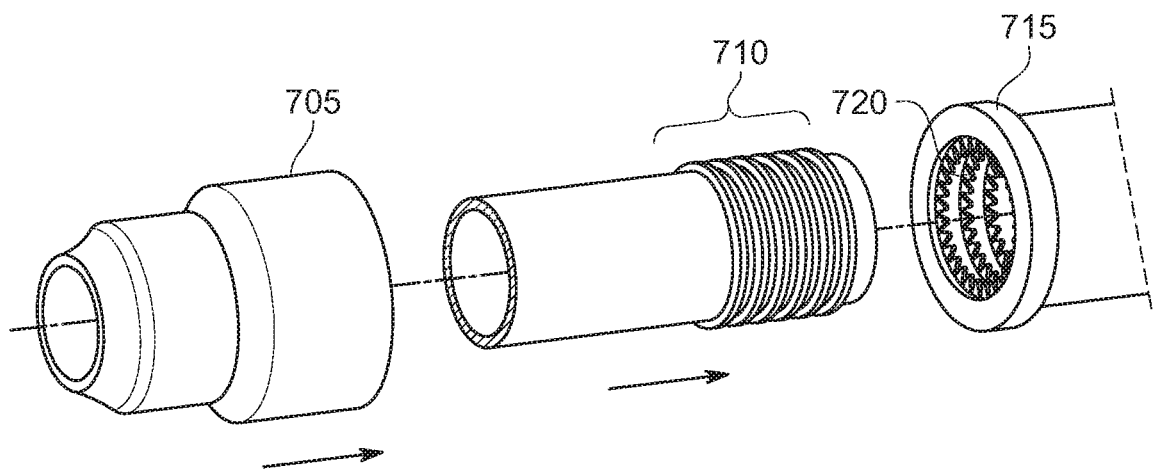
Figure 12C:
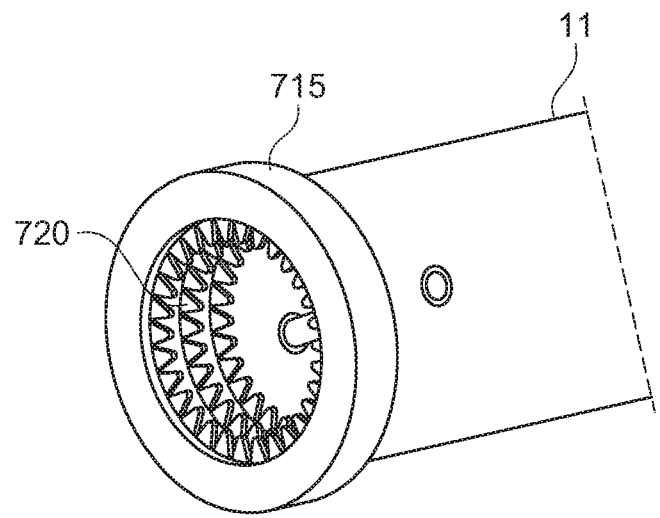

Turning to FIGS. 12A-C, these figures show another system for joining foundation components according to various embodiments of the invention. System 700 relies on a press fit between them that has far less resistance on insert than on removal. Grab ring assembly 720 fits over the top end of the screw anchor. Grab ring assembly has a collar portion 715 that fits over the upper end of the screw anchor to limit the depth of penetration. It may include multiple grab rings that comprise individual tabs or teel that are angled towards the bottom of the screw anchor. The assembly may include a stop at the bottom, or, alternatively, the stop may be formed in the top end of the screw anchor. The assembly may be welded to the screw anchor or otherwise attached to prevent it from rotating or coming out. The upper leg is formed with a series of stamped, swaged or welded threads that circumscribe its outer surface near the bottom. As the upper leg is manually inserted into the open end of the screw anchor, the ridges slide past successive ones of the grab rings until it rests against the stop. The downward angle of the rings will allow the ridged upper leg to pass by without excessive resistance, however, once it bottoms out, it will very difficult to remove it from the screw anchor with axial force alone. Also, though not shown in the figure, the top portion of the grab ring assembly may have facets or other driving features that positive engage with the driving head of a rotary driver to enable the driver to impart torque to the screw anchor.

The system of FIGS. 12A-C also includes optional cover 705. Cover 705 may be slid over upper leg 13, staring at the top end with the largest diameter portion facing screw anchor 11. It may be slid all the way down upper leg 13 until the top of the grab ring assembly contacts the narrower diameter portion of the collar. Also, an EPDM or other rubber collar may extend from the top of the narrower portion of the collar to reduce the ingress of water into the coupling.

FIGS. 13A-D show various additional methods of interconnecting upper legs to the bearing adapter according to various embodiments of the invention. Starting with 13A, in system 800, the top end of each upper leg 13 has been modified to include threads 802 on the inside surface. This could be full threads, a partial thread form, or even dimples or other shapes pressed into the outside of the upper leg that create thread-like features on the inside. Then, puck insert 804 is threaded into the upper leg along threads 802. In various embodiments, puck insert 804 may have a tensioning bolt 805 projecting out of it that extends above the open upper leg to receive bearing adapter 610 and retention nut 806, as shown. In other embodiments, puck insert 804 simply has a threaded opening in it and receives the threaded end of bolt 805 after the bolt is passed through bearing adapter 610 and one or more washers, if necessary. In such embodiments, nut 806 may not be necessary because the puck insert functions as a nut. Puck insert 804 may have two or more holes formed in it that enable a special tool to be inserted that can impart torque to the puck to drive into threads 802 formed on the inner surface of upper leg 13. In other embodiments, puck insert 804 may be formed in upper leg 13 at the time of manufacture. In fact, it may be welded inside or part of a cap or other structure that mechanically engages with the end of upper leg 13 and is welded in place.

Figure 13A:
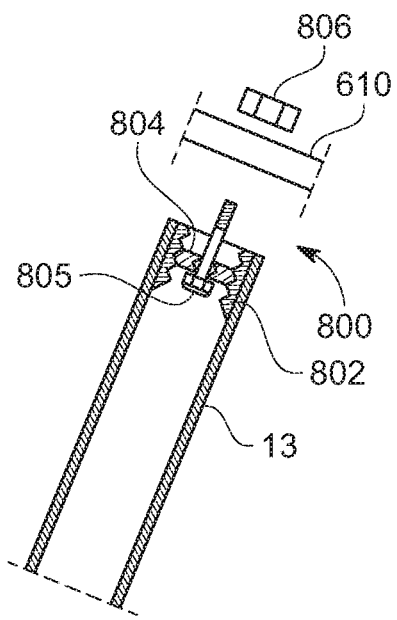
FIG. 13A shows a system for connecting a truss leg to a single-axis tracker according to various embodiments of the invention.
Figure 13B:
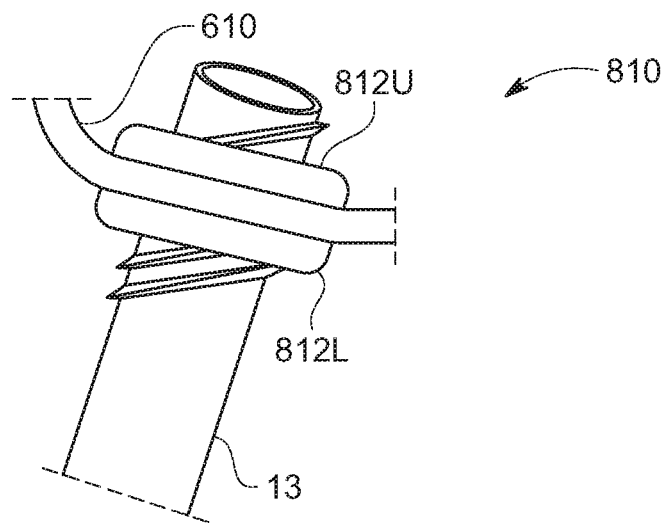
FIG. 13B shows another system for connecting a truss leg to a single-axis tracker according to various embodiments of the invention.
Figure 13C:
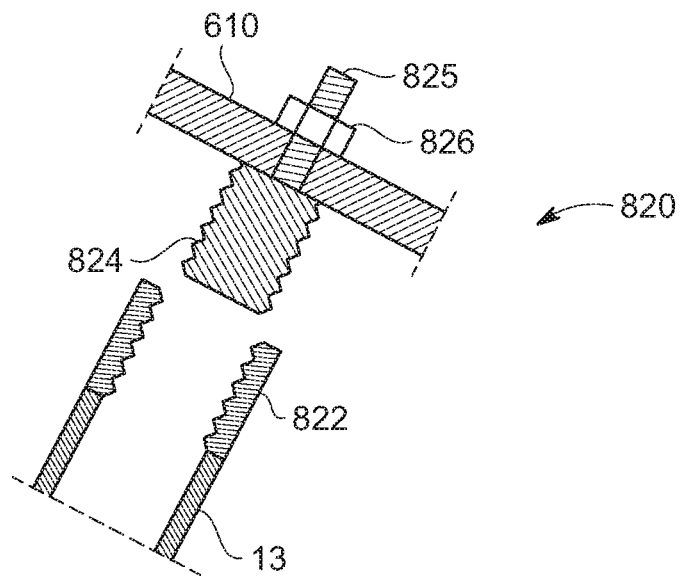
FIG. 13C shows an additional system for connecting a truss leg to a single-axis tracker according to various embodiments of the invention.

FIG. 13B shows a system for joining the upper legs to a bearing adapter according to various other embodiments. In system 810 shown in this Figure, the top end of upper leg 13 has been modified to include an external thread form. Then, a lower retention nut 812L is threaded onto this thread form, to the desired height. Bearing adapter 610 includes an opening that is large enough to allow it to to be passed over the threads of upper leg 13, and a second retention nut 812U is threaded overtop to sandwich it together. This will allow for some degree of axial adjustment.

FIG. 8C shows yet another system for connecting a foundation component to a single-axis tracker according to further embodiments of the invention. In system 820, the inside surface of upper leg 13 is again modified to include thread-like features 822. Anchor insert 824, which substantially matches the inside diameter of the leg 22 at features 822 is threaded into the upper leg to engage with those features 822. In various embodiments, and as shown in the Figure, anchor insert 824 has an anchor bolt 825 projecting above it. Anchor bolt 825 is passed through a hole or slot formed in the bearing adapter 610 and retaining nut 826 is threaded over stud 825 to capture bearing adapter 610 against anchor insert 824. Anchor insert 824 may be manually threaded into the top end of upper leg 13 or screw in with a tool. The depth of insertion may provide some axial adjustability for the bearing adapter. Also, the head of anchor bolt may be semispherical to allow it to project out of insert 824 at multiple different orientations to compensate for angular misalignment.

Figure 13D:
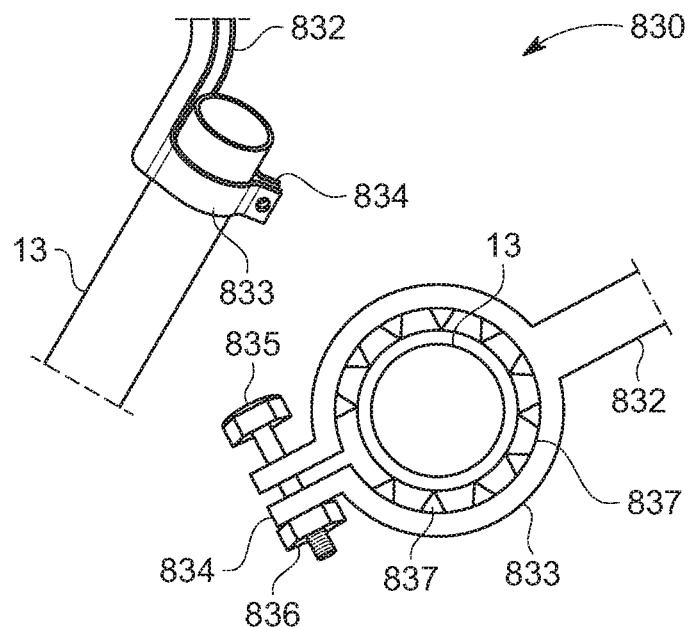
FIG. 13D shows yet another system for connecting a truss leg to single-axis tracker according to various embodiments of the invention.
Figure 14A:
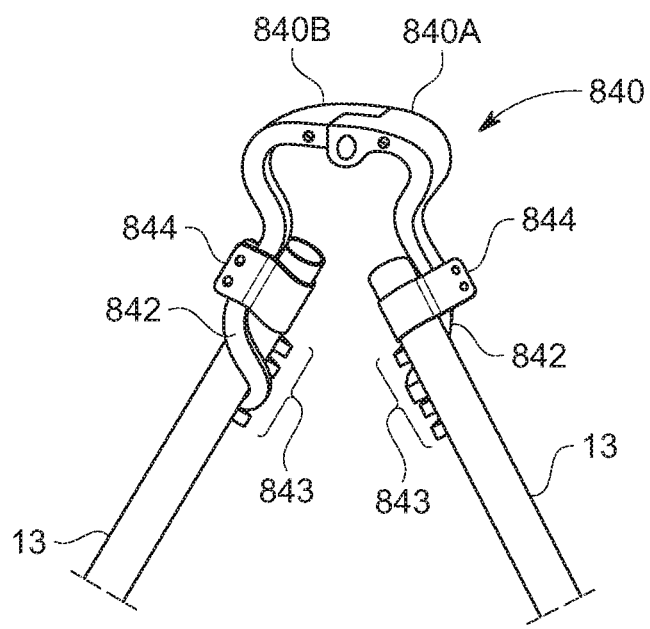
FIGS. 14A-D show various views of a bearing adapter and systems for interconnecting a bearing adapter to a truss foundation according to various embodiments of the invention.
Figure 14B:
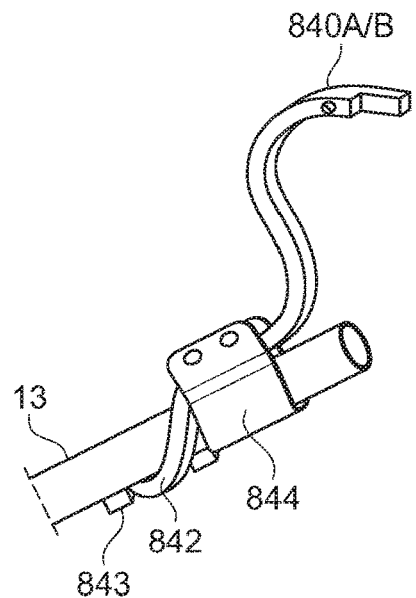
Figure 14C:
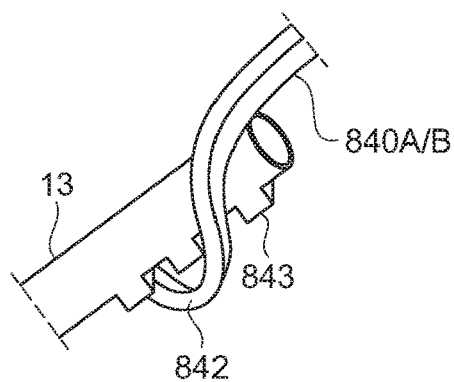
Figure 14D:
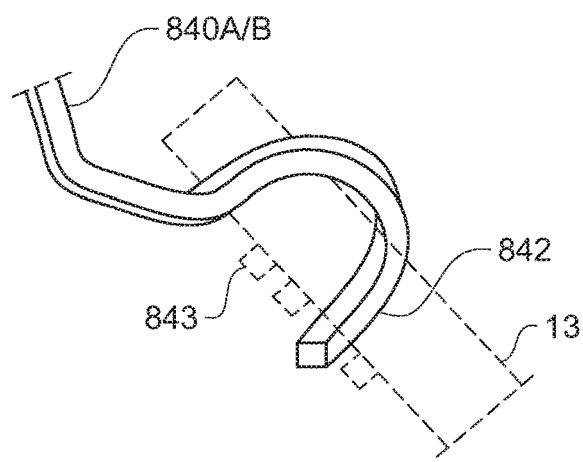

FIG. 13D shows yet another system for connecting a foundation component to a single-axis tracker according to various embodiments of the invention. System 830 relies on bearing adapter 832 that terminates on each side in leg clamps 833 and flanges 834 that are compressed around upper legs 13 via retention bolt 835 and nut 836. In various embodiments, teeth or other projections 837 are formed on the inner surface of clamp 833 so that when flanges 834 are squeezed together, teeth 837 cut into upper leg 13 to prevent it from sliding axially along the post. It should be appreciated that the geometry of bearing adapter 832 will also prevent movement because of the angle of legs 13. In various embodiments, bearing adapter 832 is installed by passing clamp 833 over the top end of each upper leg 13 with flanges 834 spread apart until clamps 833 reach the point that enables the bearing in bearing adapter 832 to be held at the desired height. Then clamp 833 is tightened down to hold it in place. System 830 may be particularly useful in applications where cutting the upper leg to length is required because it does not rely on any preformed features in the leg itself such as threads or holes.

FIGS. 14A-D show various views of a bearing adapter and systems for interconnecting a bearing adapter to a truss foundation according to various embodiments of the invention. This system relies on gravity and geometry to assist installation. In these embodiments, bearing adapter 840 is made of two substantially symmetric halves 840A/840B that attach to respective legs and join together at the top with overlapping bearing portions. Each half 840A/B terminates in a curled arm section 842 that wraps around one of the upper leg sections 13, fitting between rack 843 formed on the outer surface. Rack 843 provides multiple different mounting points depending on the distance between the truss legs. In various embodiments, each half 840A/B may be manually placed onto the leg so that it curves through rack 843 and the upper bearing portions overlap. Retaining screws or other structures may be used to hold halves 840A/B proximate to the bearing opening. Looking for example at FIG. 14C, the left adapter half 840A is tilted so that the support bar can be moved over rack 843 to find the correct notch to fit in. Then, rotating it down so that the flat portion of the bearing adapter half rests against upper leg 13, will lock bearing adapter half 840A/B in place. Then, collar, clamp, or other structure 844 may be sleeved over bearing adapter half 840A/B at the point where bearing adapter half 840A/B contacts upper leg 13. This will prevent bearing adapter half 840A/B from rotating downward to an orientation where it can be disengaged from upper leg 13. Alternatively, and as shown in the figures, collar or claim 844 may be opened up via a hinge and then closed around upper leg 13 and bearing adapter half 840A/B. One or more bolts or other mechanical fasteners may be used to keep sleeve 844 closed around upper leg 13 and bearing adapter half 840A/B. When the two bearing adapter half sections are joined, a portion of each may overlap to define a single bearing at the approximate cusp of the resultant cardioid-shaped member. The bearing may receive a bearing pin from which the torque tube is suspended similar to other bearing adapters shown and discussed herein.

Figure 15A:
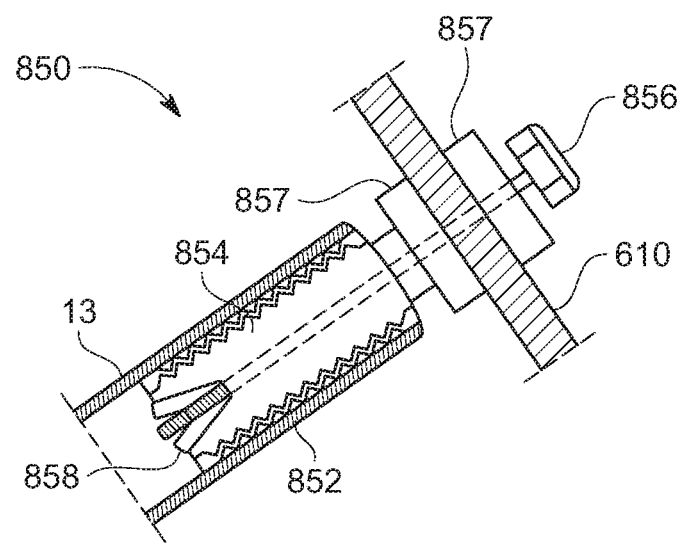
FIGS. 15A and B show partial cutaway views of another system for joining truss legs to a single-axis tracker according to various embodiments of the invention.
Figure 15B:
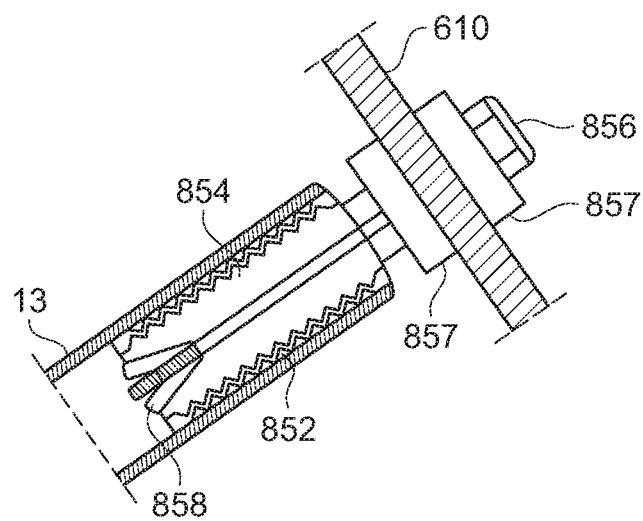

FIGS. 15A and B show partial cutaway views of another system for joining foundation components to single-axis tracker according to further embodiments of the invention. System 850 shown in these figures uses a combination of positive engagement and a wedge to secure bearing adapter 610 to each upper leg. In this system, the top end of each upper leg 13 has been modified to included threaded or ribbed features 852 similar to that shown, for example, in 13A and 13C. Then, wedge 858 and expansion clamp assembly 854 are threaded or inserted into each upper leg. Tensioning bolt 856 is passed through an opening on bearing adapter 610 into each upper leg 13, extending through the expansion clamp 854 and threaded into wedge 854. FIG. 15A shows the entire assembly in the resting or installation position. In this position, threaded expansion clamp 854 and wedge 858 fit inside upper leg 13, either by direct insertion or threading in against features 852. FIG. 15B shows the assembly after tensioning bolt 856 has been tightened down. As it tightened down, wedge 858 is pulled up into expansion clamp 854, causing the lower portion of it to increase in diameter. This in turn causes clamp 854 to positively engage threads, rings, protrusions, or other features 852 on the inside of the top end of upper leg 13. This positive engagement combined with friction will robustly resist axial forces trying to pull the assembly out or push it further into upper leg 13. In various embodiments, wedge 858 and bolt 856 may be made out of a hardened material so that wedge 858 will be capable of deforming clamp assembly 854 when bolt 856 is tightened.

Figure 16A:
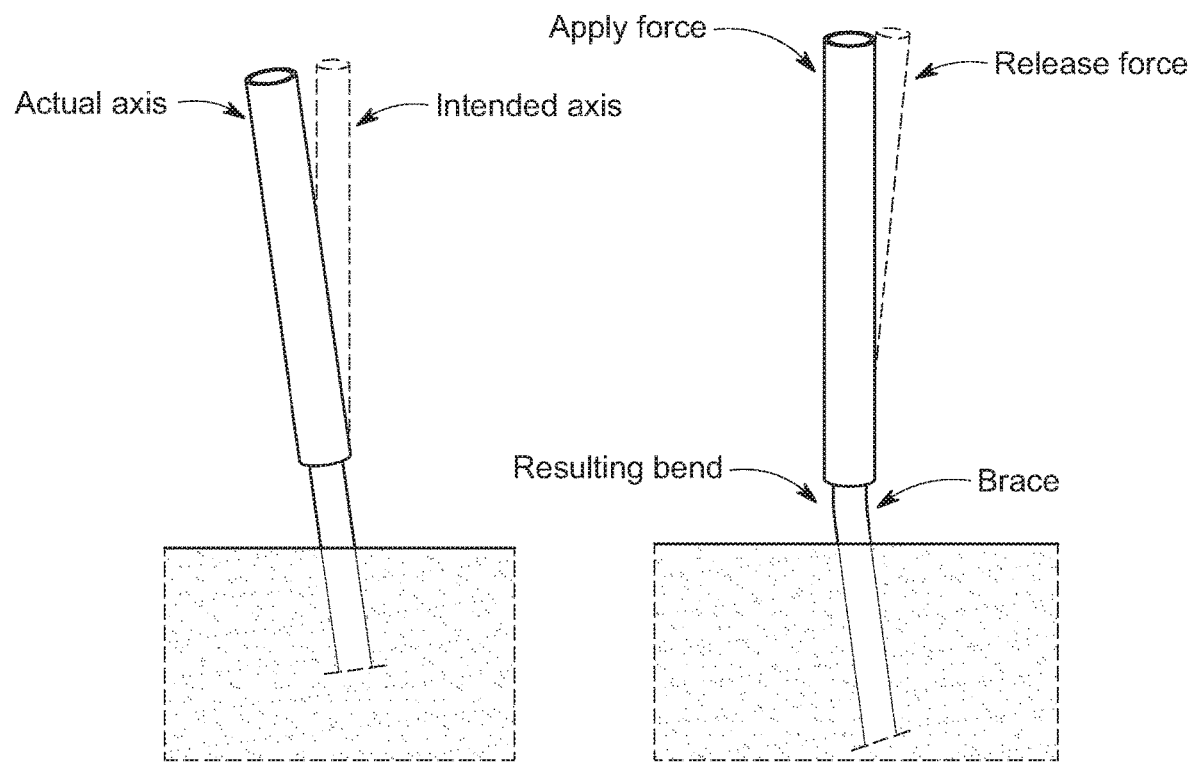
FIGS. 16A and B show methods for correcting for truss leg misalignment between an intended and actual drive axis according to various embodiments of the invention.

Although various ones of the embodiments shown herein provide some degree of adjustability to take up misalignment between the legs and the tracker components, in some cases, it may be necessary to adjust legs that are already installed to bring them close enough into alignment to take advantage of these embodiments. In such cases, it may be necessary to bend the truss legs after the screw anchors have been driven and the upper legs attached to them. This is seen, graphically, for example, in FIGS. 16A and B. In FIG. 16A, a screw anchor and upper leg have been successfully joined, however, because the screw anchor was misaligned with its intended driving axis, the resulting truss leg is also misaligned from its intended axis. Although it could be manually forced into place so that an adapter, bearing adapter, or other apex hardware or tracker components can be attached, this lateral misalignment could pre-load the bearing, torque tube, and/or foundation or give it a twisted orientation. Over time, this pre-load could increase the rate of degradation of the foundation or tracker system components. Therefore, in some cases of misalignment, it may be necessary to bend truss legs to bring them into tolerance prior to connecting tracker hardware. This may be done manually, by an installer applying torque to the upper end of the upper leg, where the most mechanical advantage is available. In other embodiments, it may be desirable to use the machine that drove the screw anchor and optionally that joined the upper legs to the screw anchors to re-align the legs. In various embodiments, the machine may be capable of grabbing the driven screw anchor and/or assembled truss leg and brining it into orientation by bending it beyond the intended axis while bracing it above ground to redirect it.

To that end, in FIG. 16A, the truss leg is bent so that the bend if formed in the top portion of the screw anchor. To accomplish this, the opposing side of the screw anchor is supported adjacent to the location of the intended bend. For example, in FIG. 16A, a bending force is applied to the upper end of the upper leg while the top portion of the screw anchor is supported or braced. This results in a bend being formed proximate to the portion of the screw anchor extending above-ground without bending the upper leg. Bending at the desired point may be accomplished by inserting a mandrel into the upper leg all the way down to the desired bend point. Then by bracing the screw anchor as the mandrel rotates about the desired bend point, the leg will bend. In various embodiments, the machine knows the distance that the mandrel is extended into the leg, the number of degrees that the leg is off and the material properties of the upper leg and screw anchor. This information may be used to calculate the degree of bending required. Metal will deform both plastically and elastically. When the bending pressure is released, the leg will flex back at least partially to oppose the direction of bend. Therefore, it may be necessary to bend the leg further than necessary to achieve the desired bend. In various embodiments, the machine will calculate the amount of over bending required to achieve the desired alignment.

Figure 16B:
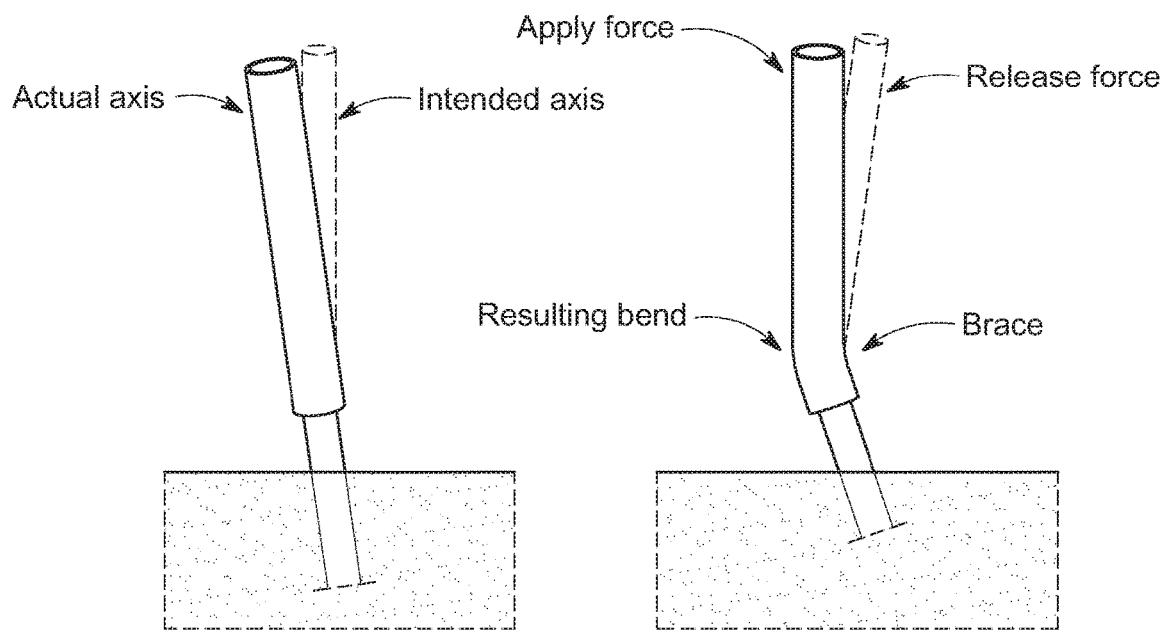

FIG. 16B shows another scenario where the truss is leg's actual axis is misaligned with the intended axis. In this case, the desired bend is in the upper leg, above the point where the screw anchor connects. To accomplish this a bending force may be applied to the upper leg while supporting it from the other side. Alternatively, a mandrel may be inserted into the upper leg down to the intended bend point while support is provided around the leg or on the side opposite the intended bend point. This will result in a bend in the upper leg at the desired bend point, realigning the truss leg. As in the example discussed in the context of FIG. 10A, the machine controlling the mandrel may calculate the required degrees of bend that will result in sufficient plastic deformation of the upper leg. In other words, the machine will have to push the leg beyond the desired angle to account for some degree of elastic deformation that will reverse when the pressure of the mandrel is removed. In various embodiments, this will be a non-linear calculation that will take as inputs material properties of the upper leg and screw anchor, depth of embedment, leg length, location of the bend point, among other data inputs.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. An assembly comprising:
   a pair of truss legs;
   a bearing adapter having a bearing rotatably receiving a rotating member; and
   a pair of bolt and wedge assemblies for connecting the truss legs to respective sides of the bearing adapter, wherein each bolt and wedge assembly comprises an expansion clamp, a wedge, and a tensioning bolt.

2. The assembly according to claim 1, wherein each of the tensioning bolts passes through respective portions of the bearing adapter to connect the adapter to the truss legs.

3. The assembly according to claim 1, wherein the wedge comprises a threaded opening receiving a threaded end of the tensioning bolt so that application of torque to the tensioning bolt pulls the wedge into the expansion clamp.

4. The assembly according to claim 1, wherein the expansion clamp comprises at least one ridge on an outer surface thereof that mechanically engages an inside surface of a portion of each truss leg as the expansion clamp is expanded by the wedge.

5. The assembly according to claim 1, further comprising a cover extending over each truss leg, between the bearing adapter and truss leg.

6. The assembly according to claim 1, wherein each bolt and wedge assembly further comprises a pair of washers oriented on opposing sides of the bearing adapter, the washers adapted to permit the bolt and the truss leg to be axially misaligned.

* * * * *